United States Patent
Seshadri et al.

(10) Patent No.: US 7,970,746 B2
(45) Date of Patent: Jun. 28, 2011

(54) DECLARATIVE MANAGEMENT FRAMEWORK

(75) Inventors: Praveen Seshadri, Bellevue, WA (US);
Michiel J. Wories, Redmond, WA (US);
Hongfei Guo, Redmond, WA (US);
Ciprian Gerea, Seattle, WA (US);
Daniel T. Jones, Sammamish, WA (US);
James A. Holt, Issaqua, WA (US);
Grigory Pogulsky, Redmond, WA (US);
Sethu Srinivasan, Sammamish, WA (US); James K. Howey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 143 days.

(21) Appl. No.: 11/535,358

(22) Filed: Sep. 26, 2006

(65) Prior Publication Data

US 2007/0294312 A1 Dec. 20, 2007

Related U.S. Application Data

(60) Provisional application No. 60/804,634, filed on Jun. 13, 2006.

(51) Int. Cl.
*G06F 7/00* (2006.01)

(52) U.S. Cl. ........................ 707/694; 707/689

(58) Field of Classification Search .................. 707/100, 707/104.1, 687, 694
See application file for complete search history.

(56) References Cited

U.S. PATENT DOCUMENTS

| | | | |
|---|---|---|---|
| 6,243,669 B1 * | 6/2001 | Horiguchi et al. | 704/9 |
| 6,256,773 B1 * | 7/2001 | Bowman-Amuah | 717/121 |
| 6,260,035 B1 | 7/2001 | Horvitz et al. | |
| 6,356,865 B1 * | 3/2002 | Franz et al. | 704/2 |
| 6,442,524 B1 * | 8/2002 | Ecker et al. | 704/277 |
| 6,493,719 B1 | 12/2002 | Booth et al. | |
| 6,601,233 B1 | 7/2003 | Underwood | |
| 6,983,456 B2 | 1/2006 | Poznanovic et al. | |
| 7,181,438 B1 * | 2/2007 | Szabo | 707/2 |
| 7,487,173 B2 | 2/2009 | Medicke | |
| 2002/0029157 A1 * | 3/2002 | Marchosky | 705/3 |
| 2002/0083148 A1 | 6/2002 | Shaw et al. | |
| 2002/0093527 A1 * | 7/2002 | Sherlock et al. | 345/736 |
| 2003/0061506 A1 * | 3/2003 | Cooper et al. | 713/201 |
| 2003/0130899 A1 * | 7/2003 | Ferguson et al. | 705/26 |
| 2003/0229529 A1 * | 12/2003 | Mui et al. | 705/8 |
| 2004/0039942 A1 * | 2/2004 | Cooper et al. | 713/201 |
| 2004/0148586 A1 * | 7/2004 | Gilboa | 717/108 |
| 2004/0230572 A1 * | 11/2004 | Omoigui | 707/3 |
| 2004/0250112 A1 * | 12/2004 | Valente et al. | 713/200 |
| 2005/0086059 A1 * | 4/2005 | Bennett | 704/270 |
| 2005/0086246 A1 | 4/2005 | Wood et al. | |

(Continued)

OTHER PUBLICATIONS

International Search Report dated Sep. 4, 2007 for PCT Application Serial No. PCT/US2007/003692, 3 Pages.

(Continued)

*Primary Examiner* — James Trujillo
*Assistant Examiner* — Linh Black
(74) *Attorney, Agent, or Firm* — Workman Nydegger

(57) ABSTRACT

User productivity can be facilitated by providing an interface between a high-level intent and low-level settings that should be configured to achieve the intent. The intent can be expressed in declarative language. The intent can be verified to determine if it conforms to a target, a policy, or both. Policy binding can provide a relationship between the target and the policy. An application view can be provided that allows the user to view a server having one or more databases.

16 Claims, 25 Drawing Sheets

U.S. PATENT DOCUMENTS

| | | | |
|---|---|---|---|
| 2006/0074980 A1* | 4/2006 | Sarkar | 707/104.1 |
| 2006/0112299 A1* | 5/2006 | Urmston et al. | 714/5 |
| 2006/0184661 A1* | 8/2006 | Weisman et al. | 709/224 |
| 2006/0184681 A1* | 8/2006 | Bernardi et al. | 709/229 |
| 2006/0195424 A1 | 8/2006 | Wiest | |
| 2006/0265353 A1 | 11/2006 | Garg et al. | |
| 2007/0093986 A1 | 4/2007 | Armstead | |
| 2007/0288500 A1 | 12/2007 | Sarnowicz | |

OTHER PUBLICATIONS

OA dated Oct. 7, 2008 for U.S. Appl. No. 11/535,375, 31 pages.
Office Action dated Apr. 15, 2009 cited in U.S. Appl. No. 11/535,375.
Office Action dated Sep. 29, 2009 cited in U.S. Appl. No. 11/535,375.
Notice of Allowance dated Mar. 23, 2010 cited in U.S. Appl. No. 11/535,375.

* cited by examiner

Policy Properties - highSecurity

- Name: highSecurity — 1102
- Owner: User name — 1114
- Description: High security configurations — 1104
- Action: Action list — 1106
- Constraint: Constraint list — 1108
- Management Facet: List of state interfaces — 1110
- New — 1112
- Created: 2006-03-10 — 1116
- Last modified: 2006-03-10 — 1118
- OK — 1122
- Cancel — 1120

Constraint Properties

- ID:
- Name: Constraint 1 — 1202
- Management Facet: List of mgmt facets — 1204

| | Property | Operator | Value |
|---|---|---|---|
| | Property 1 | Equals | |
| * | Property / Constraint list | | |

1206 — Property
1208 — Operator
1210 — Value

- OK — 1214
- Cancel — 1212

Policy Instance Management

| ID | Policy | Schedule | Action | Status | |
|----|--------|----------|--------|--------|--|
| 1 | highSecurity | myDaily | Check compliance | Enabled | View History |
|   |          |         |                 |         | View History |

Deployed Policy Properties

- Policy: List of policies — 1802
- Constraint: NameConventionConstraint — 1806
- Action: Check on schedule — 1808
- Schedule: List of schedules — 1804
- ☑ Recursively Check all descendent — 1824
- Target set: Server Databases * — 1810
- ID: 1 — 1812
- Owner: Owner name — 1814
- Description: Check high security policy daily — 1816
- ☑ Enabled — 1826
- View Report History — 1828
- Created: 2006-03-10 — 1818
- Last modified: 2006-03-11 — 1820
- Last executed: 2006-03-12 — 1822

[ OK ]  [ Cancel ]

1800

DECLARATIVE MANAGEMENT FRAMEWORK

CROSS-REFERENCE TO RELATED APPLICATIONS

This application claims the benefit of U.S. Provisional Application Ser. No. 60/804,634, filed Jun. 13, 2006, entitled "DECLARATIVE MANAGEMENT FRAMEWORK," the entirety of which is incorporated herein by reference. This application is also related to—U.S. patent application Ser. No. 11/535,375 filed on Sep. 26, 2006, entitled "EXTENSIBLE DATA COLLECTORS", which claims the benefit of U.S. Provisional Application Ser. No. 60/804,629, filed Jun. 13, 2006 entitled "EXTENSIBLE DATA COLLECTORS. The entirety of each of these applications are incorporated herein by reference.

BACKGROUND

System administrators on a daily basis can manage databases or other servers that have a large number of installed applications. System administrators configure the databases or servers to meet various administrative goals or management policies, such as, providing the data in a recoverable format in preparation for a system failure. In addition, the system administrator should monitor the policies for updates, report on the state or health of the system (e.g., whether it is conforming to the desired policy), react when the system no longer conforms to the desired policy, as well as other actions.

In order to perform such actions, the system administrator translates policies into a set of detailed low-level actions that are utilized to configure the system. This requires significant knowledge of the options exposed by the installed applications and the details and semantics of the deployed applications since system administration is generally not easy and intuitive. The system administrator may establish separate monitoring and reporting mechanisms and, if automation is desired, it has to be established manually. The system administrator repeats this process individually for every target being managed, thus, there are no efficiencies of scale in management. This results in redundant time and effort being expended for each managed target.

The syntax to perform such function can become esoteric and not user-friendly with regard to enabling, disabling, or changing various settings. In addition, there is no consistency in the location of various settings. For example, some settings appear on a display while others are not displayed. These as well as other factors increase the amount of time spent to locate and change each setting.

To overcome the aforementioned as well as other deficiencies, what is needed is dynamic mediation between a system administrator's intent and the low-level settings required to achieve that intent. What is also needed is a more centralized location for the various settings, such as on a display.

SUMMARY

The following presents a simplified summary in order to provide a basic understanding of some aspects of the disclosed embodiments. This summary is not an extensive overview and is intended to neither identify key or critical elements nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with improving user productivity in relation to data management products. Mediation between an administrator's intent and the low-level settings that should be modified to achieve that intent is provided to mitigate user interaction (e.g., mastering and applying a large body of complex commands).

Embodiments can provide mediation between a user's intent and the low-level settings required to achieve that intent, thus freeing a user from the burden of mastering and applying a large body of complex commands. The same facet can be presented by objects that are configured in distinct ways, thus the user does not have to learn the specialized semantics for configuring the individual objects. A policy can be applied against a facet and users can, with a single policy, configure all the multiple objects that present this facet. A facet can abstract separate settings, such as from distinct targets (e.g. a resource consumption facet might together monitor and configure both the OS file system and a database server's remaining empty pages). Policies can be aggregated into "composite management policies".

In accordance with some embodiments, a user can, on an ad hoc basis, direct a declarative management (DMF) system to check whether a given target complies with a given policy. DMF can include the ability to reconfigure a non-compliant target in order to force policy compliance. Based on individual attributes of management facets, DMF recognizes a "configurable" policy and/or an "enforceable" policy, whether simple or composite. Provided is the ability to automate policy checks on a schedule, with or without configuring non-conforming target sets. Also provided is the ability to automate policy checks on any change, with or without configuring non-conforming target sets, which can provide immediate warning of any deviations.

Automatic policy checks can be coupled with an action or a series of actions to take after policy evaluation (e.g. email might be sent when a security policy fails). Actions can be associated with policy evaluation success or failure. Mechanisms can be included, where possible, to detect attempts to take the facet out of compliance and prevent them, (e.g., automatic policy enforcement). Policies can be targeted at any level in a hierarchy that extends from a single object on a server, up to the enterprise. Policies targeted at applications might apply only to those objects on a server that belong to that application. The user can bring many objects under a policy by targeting the policy at the root of the hierarchy containing those objects. With a single action, the user can reliably change a setting, or can check, configure, or automate policy enforcement on many machines. Included can be collectors to sample and aggregate performance or other dynamically varying data, and make it available to management facets.

Some embodiments can be implemented with an integrated security model. Policies deployed at a high level can supersede lower-level policies (e.g. a server group policy has precedence over a database policy). Users might see only those portions of a target set or policy that they have permission to see. DMF allows users to indicate target elements that make up an "application". DMF applications may extend across multiple servers, perhaps from multiple products (e.g., vendors). Applications can be imported from one target, saved, and later deployed as a unit to new targets. The disclosed embodiments can be utilized to view the history of the different policies and policy versions and their association with management targets. A user can view the effective policy on any target (e.g., those portions of any policy that directly constrain this target). Also provided are methods to script, import, and export policies and bindings for archival or deployment purposes.

Embodiments can be incorporated into software install or application deployment to mitigate the chances of a system being released to users before it is configured to comply with enterprise policies. Including the management facet as one construct in an extensible API enables users to create their own management facets to capture and carry out their administrative goals. Including the management target as one construct in an extensible API means that additional management targets can be brought under declarative management by the user or software vendor that implements a new DMF target. DMF enables automation of the entire management lifecycle, including automatic configuration on deployment, automatic monitoring, automatic compliance reporting, and automatic maintenance/tuning. In many cases, this leads to an entirely self-managing system.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 11 illustrates an exemplary user interface for policy properties.

FIG. 12 illustrates an exemplary user interface for constraint properties.

FIG. 17 illustrates an exemplary policy instance management user interface.

FIG. 18 illustrates an exemplary user interface for deployed policy properties.

DETAILED DESCRIPTION

Figure 1:
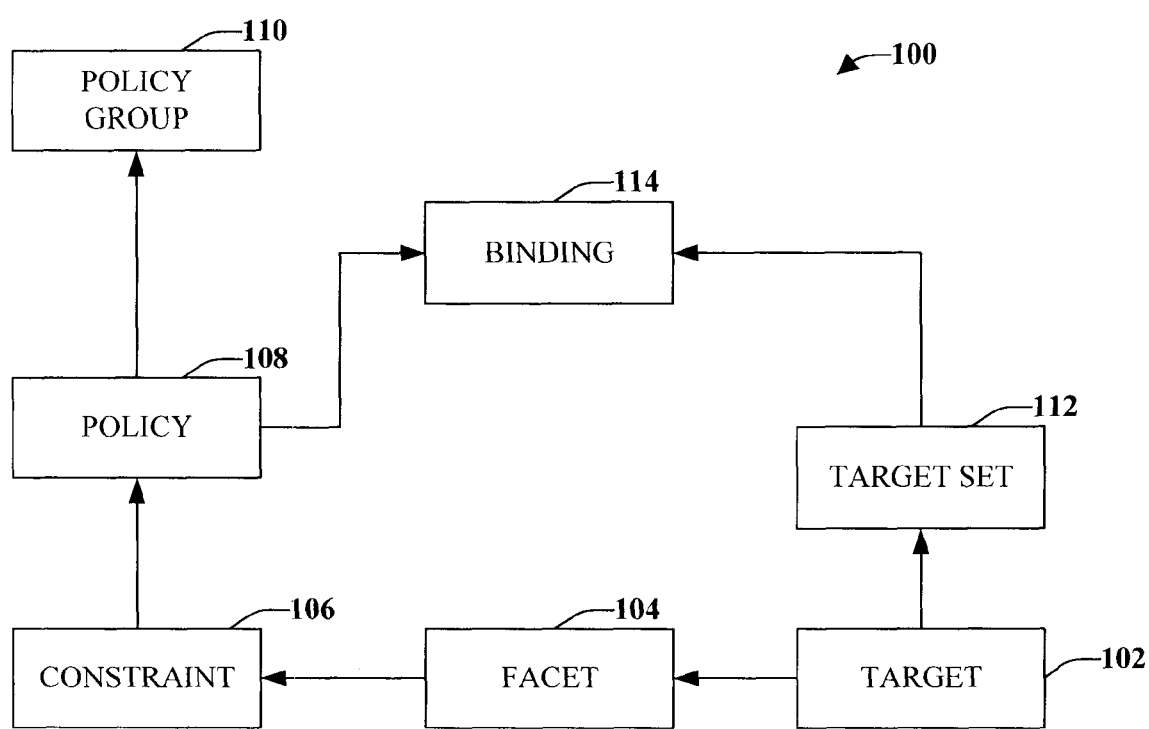
FIG. 1 illustrates a high-level block diagram of a system architecture.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component, "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Any reference to memory, storage, database, or other medium as used herein can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

As used herein, the terms to "infer" or "inference" refer generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Various embodiments will be presented in terms of systems that may include a number of components, modules, and the like. It is to be understood and appreciated that the various systems may include additional (or may not include all of) the components, modules, and the like discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In the following detailed description, various aspects and embodiments may be described in the context of a SQL server. While these inventive aspects may be well suited for use with the disclosed embodiments, those skilled in the art will readily appreciate that these inventive aspects are likewise applicable for use in various other data management produces. Accordingly, any reference to an SQL server is intended only to illustrate the inventive aspects, with the understanding that such inventive aspects have a wide range of applications.

Referring initially to FIG. 1, illustrated is a high-level block diagram of a system architecture 100. A database or system administrator (hereinafter referred to as user) is generally responsible for providing continuing correct operation of a variety of services (e.g., relational databases) in connection with a data management product (e.g., an SQL database or server). The services or entity to be managed is referred to herein as a target 102 and system 100 should be configured to achieve such goals or management policies that relate to the target 102.

When defining such policies, greater productivity can be achieved when logical or declarative statements are utilized to describe what should happen (e.g., "I should be able to recover data to within an hour") versus physical statements describing how they should be enforced (e.g., "create a backup job with an hourly schedule"). Thus, policies should be expressed in terms of the user's intent as opposed to being expressed in terms of the actual configuration settings that should be changed to facilitate such goals.

The actual implementation of a policy can be complex because there can be many low-level settings that are each manipulated with distinct semantics. In addition, settings the user may desire to treat together may be exposed in different locations, in different ways, or both. In many cases, the user is compelled to apply a single setting repeatedly on multiple similar objects (e.g., each database uses a particular sort order for character data). A facet 104 can be utilized to bridge the gap between the user's intent and the low-level settings. The facet 104 can be considered a set of logical properties that models a particular dimension of an user intent. A user can create policies against high-level constructs exposed by the facet 104, which can be configured to translate the policies into commands that can be utilized to interrogate or configure the underlying target 102.

Target(s) 102 can expose state or metadata through facet(s) 104. For example, a Table can have a state corresponding to its schema metadata (e.g., name, owner, and so on). There is a state corresponding to its physical storage (e.g., partitioning, file groups) and a state corresponding to the data content (e.g., size, number of rows). These can be different facets and each facet of a target type is an interface to specify an intent.

Policies can be statements about the acceptable state of a facet 104, for example. In classic declarative style, policies specify the desired state of a target 102, not how to achieve the desired state. For example, a policy on schema metadata might specify that the name should start with "xy_". These specifications can be defined as constraint(s) 106 on acceptable states (e.g. through simple Boolean expressions over the attributes of the facet 104). Thus, a constraint 106 can be a Boolean function with a single facet parameter, specifying a set of allowed states.

A policy 108 can specify a constraint 106 and its behavior (e.g., the way the constraint 106 is executed). Different policies can be aggregated into composite policies or a policy group 110 (e.g., a single policy might contain all the security requirements for a machine, or an overall server policy might combine a naming policy, a surface-area policy, a data recoverability policy, a space-management policy). Policies can reference other policies.

An individual policy 108 may be explicitly evaluated against a target 102 or set of targets. A policy 108 may be applied to a single object or a collection of objects (e.g., the policy might apply to all the objects of a database). A policy 108 may also be applied across an enterprise (e.g., it might be applied to all the servers in a web farm). Enterprise management is a framework that can simplify and lower the total cost of enterprise system administration where configuration and maintenance policies span multiple heterogeneous server instances (e.g., server farms, federated servers).

The collection of objects subject to a policy 108 is referred to as a target set 112, wherein the target set 112 is a set of managed targets specified by a path expression. The target set 112 consists of all the targets under that path. The association of a policy 108 and a target set 112 is referred to as a policy binding 114, which is an M:M relationship between policies 108 and managed target sets 112. By utilizing target set(s) 112, users can check or configure all their machines with a single action. System 100 can automatically apply a particular policy to a particular set of targets through policy binding. The binding can also specify the type of behavior desired (e.g., checking for violation, changing the target to conform).

Utilizing declarative management expressed as a declarative intent, a user can request that a policy 108 be compared to a given target set 112 and such user can be informed whether the target set 112 complies with the policy 108. A declarative management user can also request that a given target set 112 be brought into compliance with a policy. The system can configure the target set 112, forcing one or more settings to yield a compliant result. If this is not possible (e.g., a policy might require that CPU usage be less than 80%), system can flag facets 104 as configurable and reject attempts to configure policies that depend on non-configurable facets. The following table represents exemplary facets that can be utilized with the disclosed embodiments.

TABLE 1

| Mgmt Facet | Properties | Supporting Target Types | Description |
|---|---|---|---|
| IDatabaseManagement | bool SupportsIndexedViews | Database | Logical Database Management properties |
| ILoginSettings | bool GuestEnabledInUserDatabase<br>string CurrentAuditLevel | Server | Logical server login related properties |
| IMemorySettings | bool AWECapability | server | Logical server memory management properties |
| IOffByDefault | Bool AdHocDistributedQueriesEnabled<br>bool DatabaseMailEnabled<br>bool IsSqlClrEnabled<br>bool OleAutomationProceduresEnabled<br>bool RemoteDacConnectionsEnabled<br>bool SqlMailXPsEnabled<br>bool WebXPsEnabled<br>bool XPCmdShellEnabled | server | Model OffByDefault configuration of the server |
| IOwnedObject<br>IStateDbObject | string Owner<br>string Name<br>string Schema<br>string Type | Schema<br>Tables<br>View<br>StoredProcedure<br>UserDefined<br>Function | |

System 100 can also provide ongoing monitoring and configuration, such as through user-selectable policy automation. If automation is invoked, the user can specify the desired behavior (e.g., check for violations, configure the target to conform, and the like). In some embodiments, automated policy monitoring can be performed on changes, with or without configuring non-conforming target sets. This can provide the user an immediate warning of any deviations.

For automation, a user can also specify when the policies should be evaluated (e.g., on a schedule, whenever a change occurs). Alternatively or in addition, system can automatically enforce the policy (e.g., not allow changes that would violate the policy). Thus, system 100 can provide a user the means to manage configurations with minimal user interaction.

DMF catalog tables can be persisted in non-volatile storage (e.g., a system database in a SQL Server instance) such as dmf_policies, dmf_constraints; dmf_bindings; dmf_target sets; and dmf_target_type_to_events. To check jobs created by DFM, the following query can be utilized:
SELECT *
FROM msdb..sysjobs
WHERE name like '% enforce_bindingOffByDefault%'

Figure 2:
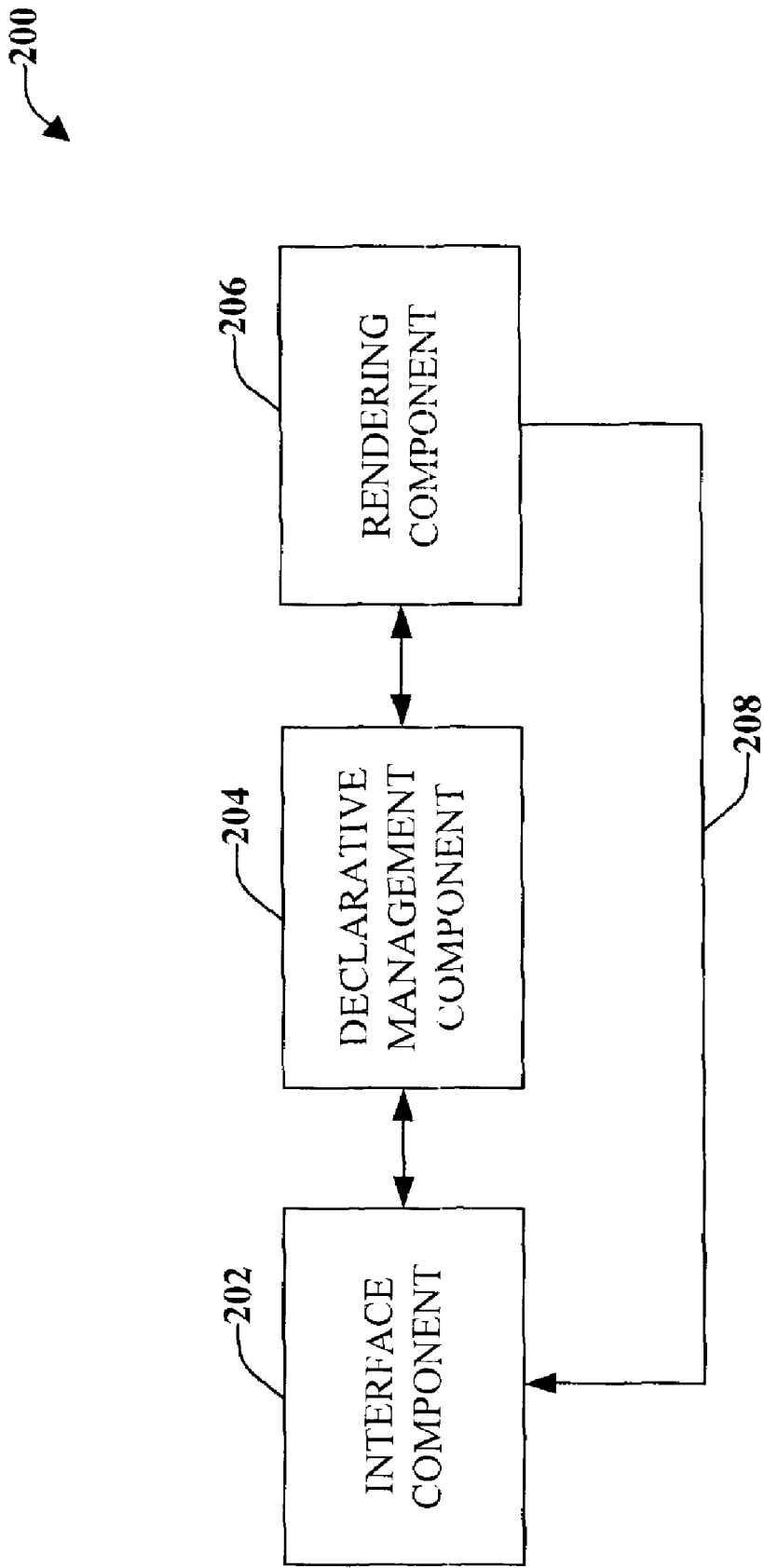
FIG. 2 illustrates a system that provides manageability of a database server.

FIG. 2 illustrates a system 200 that provides manageability of a database server. Users can manage a database server throughout its lifecycle, and can manage multiple applications that are hosted on the database server throughout their lifecycle. Manageability is a measure of how well the system enables user productivity. Productivity can be directly proportional to the ease-of-use, familiarity, intuitiveness and/or reliability of various user functions. Productivity can also be directly proportional to either or both, the automation of management functions and the ability to manage large numbers of instances and deployments in a common and consistent manner. System 200 can be incorporated during a software install or application deployment so that a system is not released before it is configured to comply with enterprise policies.

System 200 includes an interface component 202, a declarative management component 204, and a rendering component 206. System 200 provides a simple and manageable means to allow a user to enter an intent and can automatically apply that intent to one or more settings to facilitate achievement of the intent with minimal user interaction. A user can enter such intent though the interface component 202.

A user can also specify one or more functions to be performed by system 200 in relation to the intent. For example, user can request that system check that a policy complies with a given target set. A user may request that a given target set be brought into compliance with a policy. Alternatively or in addition, user can request policy automation. Examples of policies include but are not limited to a naming convention policy, a name constraints policy, a secure login policy, a configuration policy, an OffByDefault policy, a compliance policy, a database management policy, an analysis services patch level policy, a backup policy, a surface area configuration policy, a server CPU utilization policy, and so on.

While defining targets, user productivity can be enhanced when these targets correspond to logical units (e.g., individual applications deployed on a server instance) rather than to physical units (e.g., individual databases or file groups). The details of translation to low-level actions are performed by system 200.

When declarative management component 204 interprets and recognizes or infers the intent of the policies (which can be the case when they are expressed in declarative terms), it can automate both monitoring and reporting. It can also automate the tuning or maintenance of system 200 to aid in conformance of the policies. Automatic tuning can include automatic index creation/deletion based on needs and usage. Automatic tuning can be activated or deactivated (turned on or off) and can be configured for aggressiveness (e.g. more aggressive to less aggressive). Automatic tuning can also include automatic aggregation design for OLAP, for example. Such design can include building a cube (allow SQL Server Analysis Services to add aggregations as it learns). In such a manner, system 200 can begin with reasonable performance and get better through usage.

For example, an intent can be expressed as, "I should be able to recover data to within an hour." Declarative management component 204 can infer that recovering data is desired (e.g., recovering lost data) and if the system is shut down (e.g., intentionally or unintentionally) an inference can be made that creating a backup copy at substantially the same time as the shutdown would achieve the user intent. This backup can occur even if the last backup was made less than an hour earlier. Thus, the user intent is satisfied even when a situation occurred that was not specifically mentioned in the user intent. If however, the intent was expressed as, "create a backup job with an hourly schedule", the user intent is not clear. The user may want a backup for various reasons, one of which may be to recover lost data, however, there could be a number of other reasons. In addition, the term "hourly schedule" does not take into account a system failure or being able to recover lost data. Thus, with the intent written in declarative language, system 200 can better infer the user intent in situations where a slight deviation from that intent (e.g., creating a backup more often than on an hourly schedule if large amounts of data are being manipulated by one or more users) would better match the user intent.

Various embodiments can be utilized to understand the intent expressed in declarative fashion. Such embodiments can include recognizing key words and applying those key words to a look-up table that contains common actions with regard to those key words. Other embodiments can include parsing the entered intent (e.g., word string) into its subcomponents (e.g. individual words) and performing one or more function on each subcomponent. Each subcomponent or key word can be analyzed to determine similar words or other words generally used in the industry or by this particular user or user group. In such a manner, repeated actions or similar actions can be identified and the same or similar settings or parameters configured for the actions. Other embodiments can utilize a syntax engine, machine learning, rules based logic, artificial intelligence, inference engine, and so on, to determine or infer a user requested intent and dynamically apply such intent to various low-level settings across many applications.

To automatically apply the high-level intent to low-level settings, declarative management component 204 can be configured to identify target elements that constitute an application. The identified target elements can be packaged as a single target consisting of various individual target elements. The resulting application can be deployed to additional systems and policies can be targeted at those objects in an application. Thus, with a single action, the user can reliably change a setting, check, configure, or automate policy enforcement on many machines. Declarative management component 204 can further remove an application without disturbing other objects on a target server.

If automation is invoked, declarative management component 204 can automatically perform the requested behavior. Such behaviors can include, but are not limited to, checking for violations, configuring the target to conform, and the like. Automation also allows the user to specify when a policy should be evaluated, when to enforce the policy, or both.

Declarative management component 204 can be configured to analyze the user intent, expressed in declarative fashion, and apply such intent to lower-level settings that should be configured to achieve such intent. It can also be configured to script, import, and export policies and bindings for archival or deployment purposes. Declarative management component 204 can recognize a configurable and/or enforceable policy, whether simple or composite, based on attributes of facets.

Facets can derive from a common interface, such as BaseFacet, which can contain dispatch methods for accessing properties and commit logic. Each facet can define properties, which can be read only or read/write properties. An adapter class can inherit from the BaseFacet interface and can aggregate an underlying object model class. The adapter can utilize the physical properties of the object model class (and other logic) to expose the facet properties.

Rendering component 206 can provide information to the user with regard to the various functions performed by declarative management component 204. Such information can be presented in report form, which can be viewed on a display screen, saved to a file, printed, and the like. Automatic policy checks can be coupled with an action or series of actions that can be autonomously performed by system 200. Actions and notifications can be associated with policy evaluation success or failure. Such notification can include automatically sending an email to a specified person or set of persons if a security policy fails, producing an audio notification, producing a visual notification (e.g., warning statement), or performing other actions (e.g., disabling one or more functions), depending on the severity of the violation and the requested notification type, if any.

The user can also view a policy for any target by accessing rendering component 206. A particular target may come under many different policies, of which some policies may have been applied to the target itself. There may be targeted applications to which the target belongs or the target may have been bound to the machine that hosts the target, or a superior group of machines. The user can view policies or potions of policies that constrain the target. In such a manner, the user can determine whether the target, policy, or constraint is still applicable or if modifications should be made to one or more parameter.

Information regarding conformance to a policy or a violation of a policy can be relayed to interface component 202 or declarative management component 204 through a feedback loop 208. Such feedback can allow system 200 to automatically configure the target or policy to achieve the desired user intent if the target or policy is in violation of one or more user-defined parameter.

If a user desires to monitor (e.g., reporting and analysis) the state of the system (e.g. adherence to policy) and analyze trends or problems, declarative management component 204 can capture the result of a policy evaluation (through feedback) and compile the obtained history of the state of the targets into an operational data warehouse for reporting and analysis. Such reporting can be utilized by the user to monitor the state of the system and the user can manually correct any deficiencies. The user may also direct system 200 to correct the deficiencies (either automatically or upon user request).

System 200 is extensible so that individual experiences (e.g. policies to manage partitioning, policies to manage date recoverability, and so on) are extensions of system 200. Neither the interface component nor other services of system are dependent on specific target types of specific facets. This separation allows users to incrementally add new declarative management facets by simply extending the programming model.

System 200 can also provide various features, such as backup/restore, index tuning/maintenance, auto recovery from physical corruption, background maintenance, and/or partition management. Automatic system 200 maintenance can include normal maintenance tasks, automatic defragmentation, automatic shrink/compression, automatic consistency checks, and/or improved automatic statistics. In some embodiments, system 200 can provide a default backup maintenance plan created on database create or the default plan can be customized. Partition management can include automatic maintenance of sliding-window schemes (e.g., create new partition/partition function, merge partitions (7 days into 1 week, etc.), archive partitions, and so on.

Automatic recovery from physical corruption can be facilitated by system 200. This can be triggered by automatic consistency checks or by detection of corruption during normal operations. Rules (e.g. rules-based component, machine learning component, and so one) can determine a restore strategy (e.g. index rebuild, page restore, file/file group, restore, whole database restore).

System 200 can be supported in three layers: a programming model, a user interface, and a management service. The programming model allows the same concept to be exposed in multiple tools, user actions can be scriptable and users can build management applications. The user interface (e.g., graphical, command-line) can be built on top of the programming model. Management services can provide the ability to automate user actions and provide a hosting environment for runtime services.

Enterprise management can be facilitated by system 200 by centrally provisioning a group (e.g., CPU, storage and memory). System 200 can also apply and enforce configuration and maintenance plans for a group and monitor the status of maintenance operations for a group. Also provided can be reusable templates for group configuration and maintenance plans as well as out-of-the box templates for backup, database consistency checks (dbcc), and monitoring policies. System 200 can be configured to modify management for group configuration and maintenance plans. In some embodiments, system 200 can deploy an application to a group of servers and dynamically re-allocate the application within the group.

There can be a formal concept of a server group with a single system view for federated servers, such as a launch-pad for group administration or roll-up of health and status monitoring. Provided can be group configuration, maintenance, and data collection policies. Also provided can be group policy conformance monitoring, enforcement, and auditing as well as application deployment to a group of servers.

System 200 can also provide declarative policy based management of database applications and environments. A policy-based framework can be provided for defining the desired operational and administrative behavior of database applications, such as performance requirements, security policy, and reliability requirements. The policies can be defined either during development or at deployment time. The database system can monitor and, where appropriate, enforce compliance of the defined behavior. This framework can be used by any component that wants to check policy before a change is committed or to enforce a server policy whenever a DDL is executed. It can also allow third party developers to implement policies using the same framework.

System 200 can provide the ability to manage a single relational database using declarative policies and the ability to manage groups of relational database using declarative policies. Also provided is a policy driven database configuration and policy driven deployment of database applications. A policy-driven engine for the configuration, maintenance, and monitoring of groups of databases enables the database administer to specify what should be done and the system can perform such action across multiple servers. Also provided is the ability to specify what should be done for configuration, maintenance, and monitoring of all databases in a group of databases, and the system performs such action across multiple servers.

Figure 3:
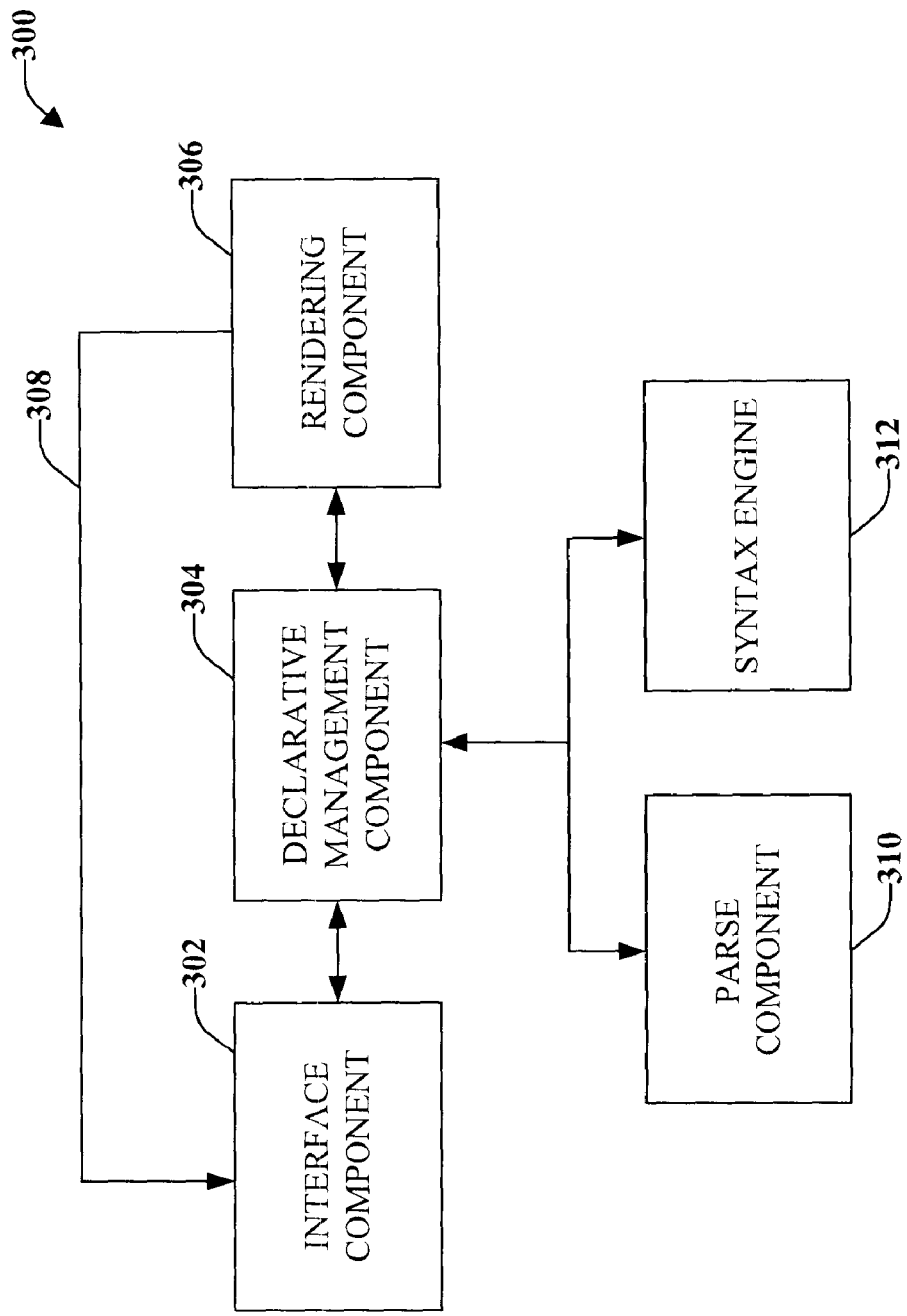
FIG. 3 illustrates a system that dynamically applies a user intent to a data management product.

FIG. 3 illustrates a system 300 that dynamically applies an user intent to a data management product. System 300 can be configured to capture administrative intent as high-level policy at a logical level that system 300 can interpret. System 300 includes an interface component 302 that can be configured to accept an input (e.g., target, policy, intent, goal, request, and the like). Such input can be received from a user (e.g., text, audio, and so on), such as a system administrator, or as feedback from system 300. A declarative management component 304 can be configured to process the input, wherein the result of the processed input is presented (e.g., displayed) or captured (e.g., reporting) by a rendering component 306. For example, rendering component 306 can present the results on a display, screen, through audio means, capture the information for later reporting purposes, and so on.

Rendering component 306 can present to the user information regarding conformance or non-conformance of a target including various forms of monitoring and reporting. The user can request rendering component 306 to provide the effective policy on any target and present those portions of any policy that directly constrain the target.

Alternatively or in addition, rendering component 306 can provide feedback to input component 302 or declarative management component 304, through a feedback loop 308, in such a manner, system 300 can continuously monitor and configure one or more set points in accordance with an intent, if system 300 is configured to automatically perform such functions. Feedback loop 308 can enable system 300 to be self-managing, self-healing, and self-tuning (e.g., work across the box, not just relational). The policy may be set up in advance allowing for zero-touch (e.g., minimize user interaction) in operation, such as by removing various settings or "knobs" from everyday use.

A parse component 310 and a syntax engine 312 can also be included in system 300. These components 310, 312 can be subcomponents of declarative management component 304 or separate components, as illustrated. The parse component 310 can take one or more user intent, which can be expressed in declarative language, and divide such language into components that can be analyzed. For example, a user can input the intent "I should be able to recover data to within an hour." Parse component 310 divides the sentence into its words and phrases (e.g., I, should, be able to, recover, data, to within an, hour). This information can be evaluated by syntax engine 312 that analyzes each word or phase to derive the specific user intent.

Certain words or phrases can be disregarded, such as "I" and "should." Other words, such as "recover" can be evaluated to determine if there is another way this term has been expressed by this user, other system users, or general terms within the industry. For example, system can relate the word "recover" with the words "backup", "failure", "lost", and the like. This can enable declarative management component 304 to infer a broader user intent and can apply this intent to multiple applications that use similar words or phrases.

Figure 4:
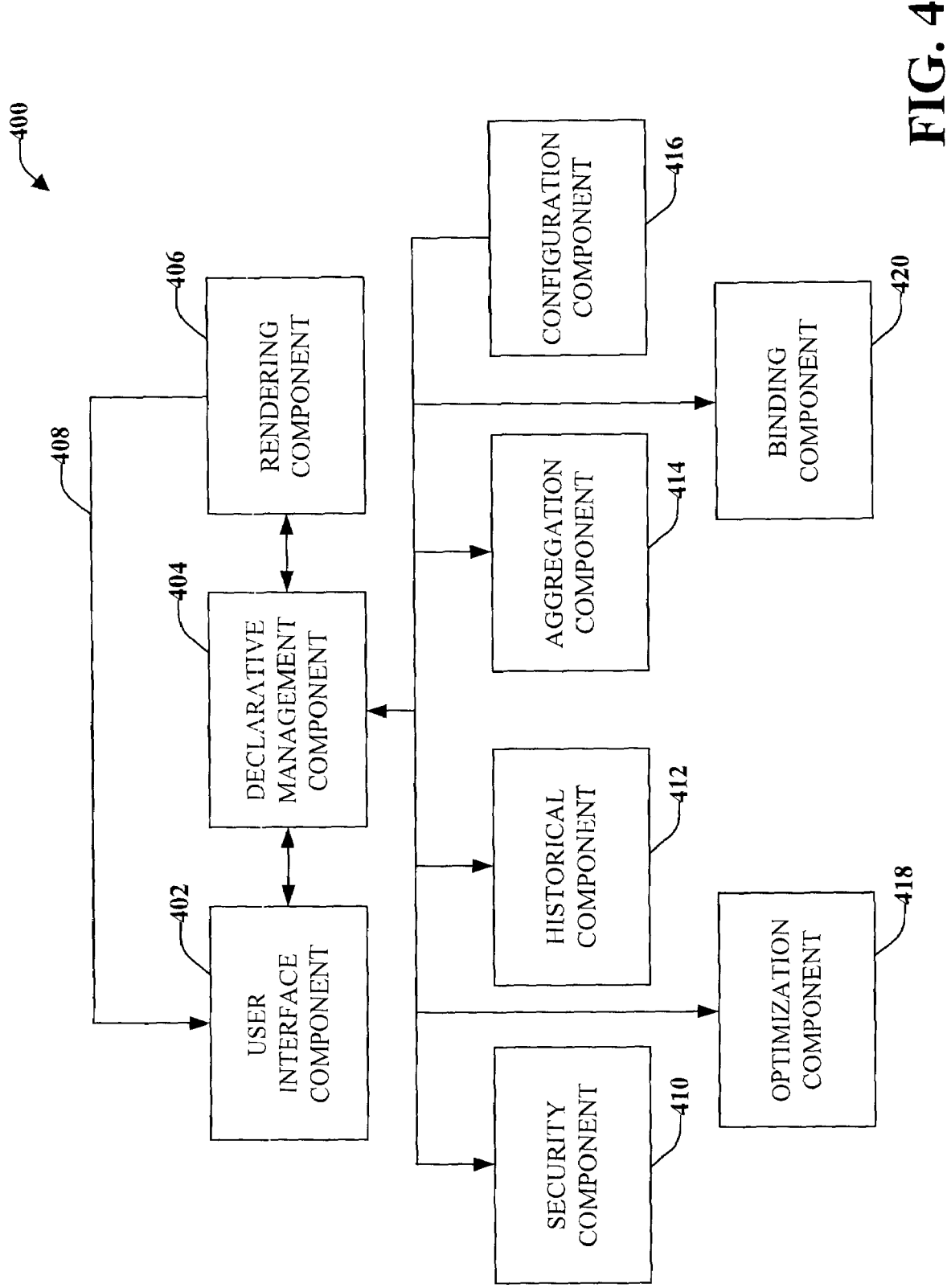
FIG. 4 illustrates a system for automatically applying a high-level intent to low-level settings.

FIG. 4 illustrates a system 400 that facilitates automatically applying a high-level intent to low-level settings. System 400 mitigates user interaction by allowing a user to define how the system should be (policy), not how to configure the system to make it conform to the user intent. Policies can relate to a variety of different categories such as security or access control, performance, capacity, operations, setup or patches, development, declarative management, and so on. The user can define an intent once at a logical level abstracted from physical implementation specification and the system applies it many times. System 400 can be housed in a data management product (e.g., SQL server). Further, system can have various modes that result in an action. Such modes include, but are not limited to, checking for compliance, configuring for compliance, and enforcing compliance.

System 400 includes an interface component 402, a declarative management component 404, and a rendering component 406 that can provide system feedback through a feedback loop 408. Various system 400 components can operate independently or in conjunction to facilitate one or more function of declarative management component 404. Such components include a security component 410, a historical component 412, an aggregation component 414, a configuration component 416, an optimization component 418, and a binding component 420. These components 410-420 can be independent, as illustrated, or subcomponents of declarative management component 404.

Interface component 402 can be a graphical user interface (GUI), a command line interface, and the like. A user can selectively configure a resulting output (e.g., changes to one or more setting) of declarative management component 404 through interaction with interface component 402. Further details regarding the interface component 402 and exemplary user interfaces is provided below.

Security component 410 can be configured to provide one or more security element or an integrated security model. Security component 410 can gather information regarding an user, such as through a unique identification associated with the user (e.g., user name, user password). Based on a predefined security level for each user, security component 410 can selectively interface with rendering component 406 so that the user is able to see only those portions of a target set or policy that such user has permission to view. In such a manner, system 400 can mitigate unauthorized modification, addition, deletion, and the like to settings for which a user is not authorized or for which a user does not have enough information and, therefore, should not modify.

In addition or alternatively, security component 410 can be configured to deploy policies in a specific manner or order, such as a predefined configuration. Such a predefined configuration can include various tasks, such as allowing policies deployed at a high level to supersede lower-level policies. For example, a server group policy can have precedence over a database policy. Security component 410 can also detect attempts to take a facet out of compliance and prevent such attempts (e.g., system can "enforce" a policy). However, it should be understood that a multitude of other configurations are available and can be configured by a user having the appropriate security level.

Historical component 412 can maintain information regarding previous policies, policy versions, targets, facets, and so on. This can provide one or more system 400 components the ability to access the previous policies, policy versions, targets, and so on, to determine the association and relevance of each. Such historical information can be maintained in a retrievable format in a storage media associated with one or more system 400 component. For example, system 400 can include memory and/or some other medium that can store information.

Historical information can be utilized by system 400 to transform a declarative statement (e.g., intent) into a low-level setting, thereby allowing automation of system 400 configuration. For example, a user can indicate target elements that make up an application and such applications can be imported from one target, saved, and later deployed as a unit to new targets. This information can also be presented to the user through render component 406, thus allowing the user to view the history of the different policies and policy versions and their association with management targets. The user can use such information to further configure system 400, determine a particular system 400 configuration, or to obtain other information regarding the past state(s) of system 400.

With physical statements applied to physical targets, the user is often forced to use server-specific or application-specific artifacts in their actions that make it almost impossible to apply intent broadly across many applications on many servers. To overcome this problem, aggregation component 414 can be configured to allow management on scale, including automation on scale. Thus, the user does not have to learn or remember specialized semantics for configuring the individual objects when the same management facet is represented by objects that are configured in distinct ways. For example, policies may be applied (explicitly or through automation) against a single target or against a group of targets. Since a policy can be applied against a management facet, by entering a single policy using interface component 402, the user can configure the multiple objects that represent this management facet. However, policies targeted at applications should apply only to those objects on a server that belong to that application. Alternatively or in addition, aggregation component 414 can abstract separate settings, such as setting from distinct management targets. For example, a resource consumption facet might both monitor and configure the operating system file system and remaining empty pages on a data server.

Configuration component 416 can allow a user to selectively configure one or more elements (e.g., policy, target) of system 400 to automatically configure the one or more elements. For example, on an ad hoc basis, a user can direct declarative management component 404 to verify whether a given target complies with a given policy. System 400 can reconfigure or perform another action on a non-compliant target to force policy compliance.

A user can incrementally add new facets or targets by extending a programming model, such as an extensible application program interface (API). APIs facilitate building software applications through a set of routines, protocols, and tools, wherein developers and/or programmers can employ the API to construct customized applications consistent with the operating environment and a user(s) needs. Including a facet as one construct in an extensible API allows users to create their own facets to capture and carry out their administrative goals. Including the target as one construct in an extensible API allows additional targets to be brought under system 400 control by the user or software developer that implements a new target.

Optimization component 418 can be configured to optimize one or more parameters of system 400. Optimization component 418 can allow system 400 applications to extend across multiple servers and multiple products (e.g., vendors). The user can bring many objects under a policy by targeting the policy at the root of the hierarchy containing those objects. Thus, policies can be targeted at any level in a hierarchy that extends from a single object on a server to the enterprise.

For a group of similar servers (e.g., multi-server configuration) system 400 provides the ability to set common configuration options, to enforce conformance to group configuration, and to audit configuration changes. System can facilitate simplifying server group maintenance by configuring common maintenance plans and jobs for groups of servers, the ability to monitor the status of maintenance tasks for a group of servers. Simplifying server group maintenance can also be provided with a central repository for maintenance plans, jobs, and scripts, as well as the ability to audit maintenance plan changes.

System 400 can facilities monitoring multiple servers by providing the ability to monitor the general health of a group of servers, to focus on a subset of servers based on a monitoring context (e.g., under or over utilized servers), and/or performance/operational data collection.

In some embodiments, optimization component 418 can be configured to provide a self-managing system by enabling automation of the entire lifecycle. This can include automatic configuration of deployment, automatic monitoring, automatic compliance reporting, and automatic maintenance and tuning of system 400.

A binding component 420 can be configured to perform binding evaluation for efficiently carrying out evaluation of one or more policy. Binding component 420 can provide an association between a policy and a target set having an M:M relationship (e.g., there is one policy per target set). That is to say, a binding consists of one policy and one target set. A policy may be referenced by more than one binding. A target set may be referenced by more than one binding. Binding behavior can be data driven, allowing standard data replication technology (e.g., transactional replication) to be used to establish groups of servers to be managed in a similar manner. In some embodiments, binding evaluation can be performed in client code by calculating a set of objects described by the target set and applying all the constraints to each target (e.g., executing the code in the expression tree contained by its constraints). Policy bindings can be stored, along with other metadata for management services, such as in a database or other storage media.

In some embodiments, the binding evaluation can be transformed into a query that can be executed in the server context. Such query can return objects that are in violation of any of the constraints in the binding. A transformation process can be employed whereby for every constraint in the binding, starting with the uniform resource name (URN) that describes the target node, the information contained in the constraint expression is used to negate it to only obtain rows that do not satisfy the constraint. An URN can be obtained that corresponds to the binding evaluation. In most cases, this URN can be transformed into a query by the enumerator and can reduce the binding to a query. For example purposes and not limitation, the following is an example of a constraint (in English) wherein all user defined stored procedures' name in database "JM_Accounts" start with "JM_".
State Interface: IDatabaseObject
Constraint: StartsWith(@Name, 'JM_')
TargetSet
Urn=Server/Database[@Name='JM_Accounts']/StoredProcedure
Filter=[@IsSystemObject=false( )]
This could be resolved into an intermediate Urn:
Server/Database[@Name='JM_Accounts']/StoredProcedure[@IsSystemObject=false ( ) and not(StartsWith(@Name, 'JM_'))]
Then the next transformation would lead it to something similar to:
Use [JM_Accounts]
Select * from sys.procedures where name not like N'JM_%'

Figure 5:
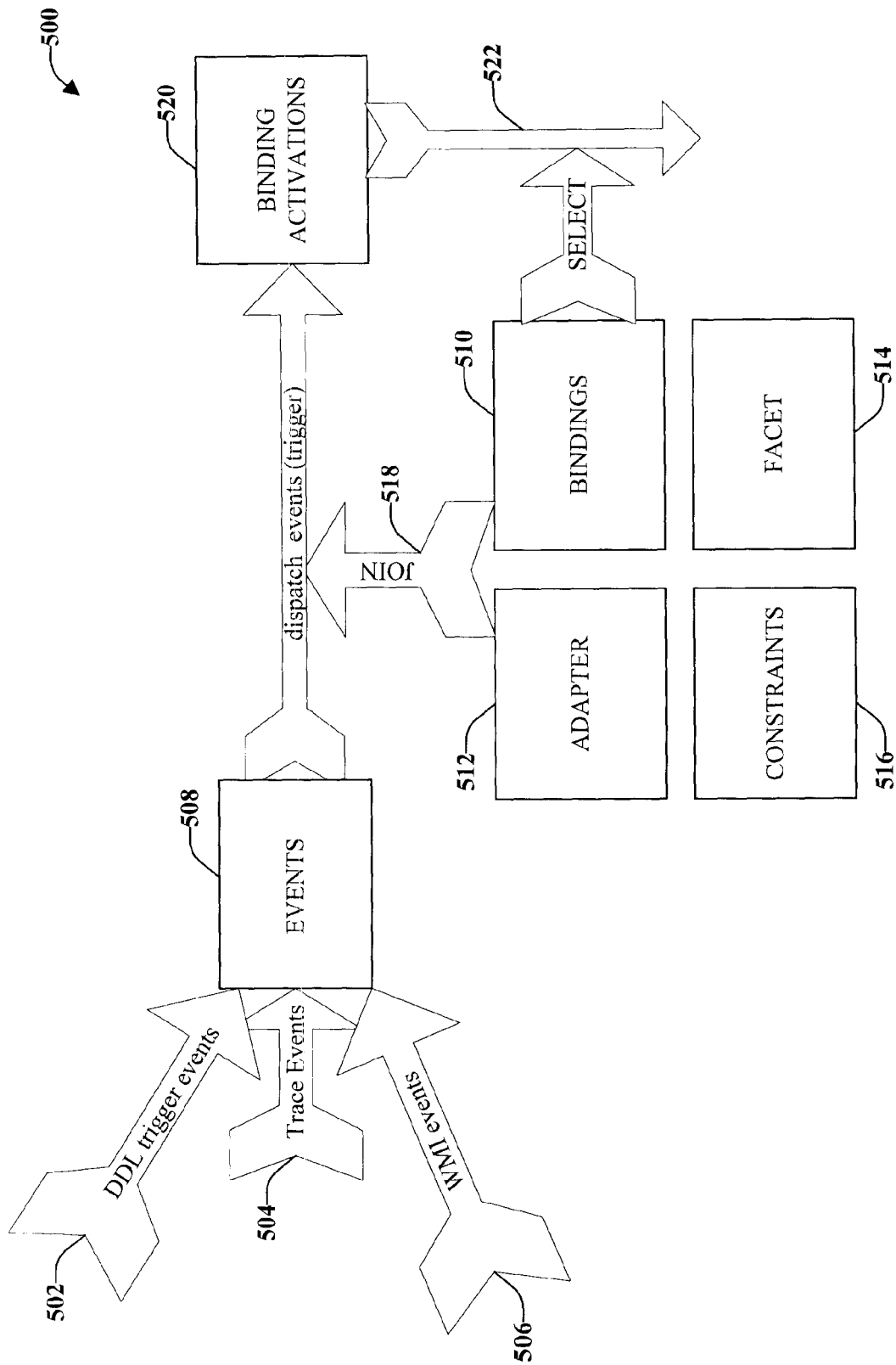
FIG. 5 illustrates an event dispatch mechanism that utilizes the disclosed embodiments.

With reference now to FIG. 5, illustrated is an event dispatch mechanism 500 utilizing the disclosed embodiments. Events, such as DDL trigger events 502, trace events 504, and WMI events 506 can be collected from multiple data sources and placed in a staging area 508, which can be a temporary table utilized to store events before they are processed. An algorithm, method, or other technique can be employed to determine what bindings 510 (present in system 500) can be interested in the event(s) 508. Such a determination can be made based on an existing adapter 512 (e.g. information about adapters registered with the system 500) for the (registered) facet(s) 514 used by constraint(s) 516 present in the bindings 510. The bindings 510, adapter 512, facets 514, and constraints 516 can represent a four-block table join 518. The bindings can be included in Binding Activations 520, which is a history table that includes the binding activation. The bindings can be activated or evaluated, as shown at 522. Custom actions can be taken based in part on the result and behavior defined, which can be to prevent the change or report the change for later analysis, for example. The binding evaluation can share the same transactional context with the operation that produced the event. Preventing the operation can including rolling back the transaction in the procedure that evaluated the binding.

Figure 6:
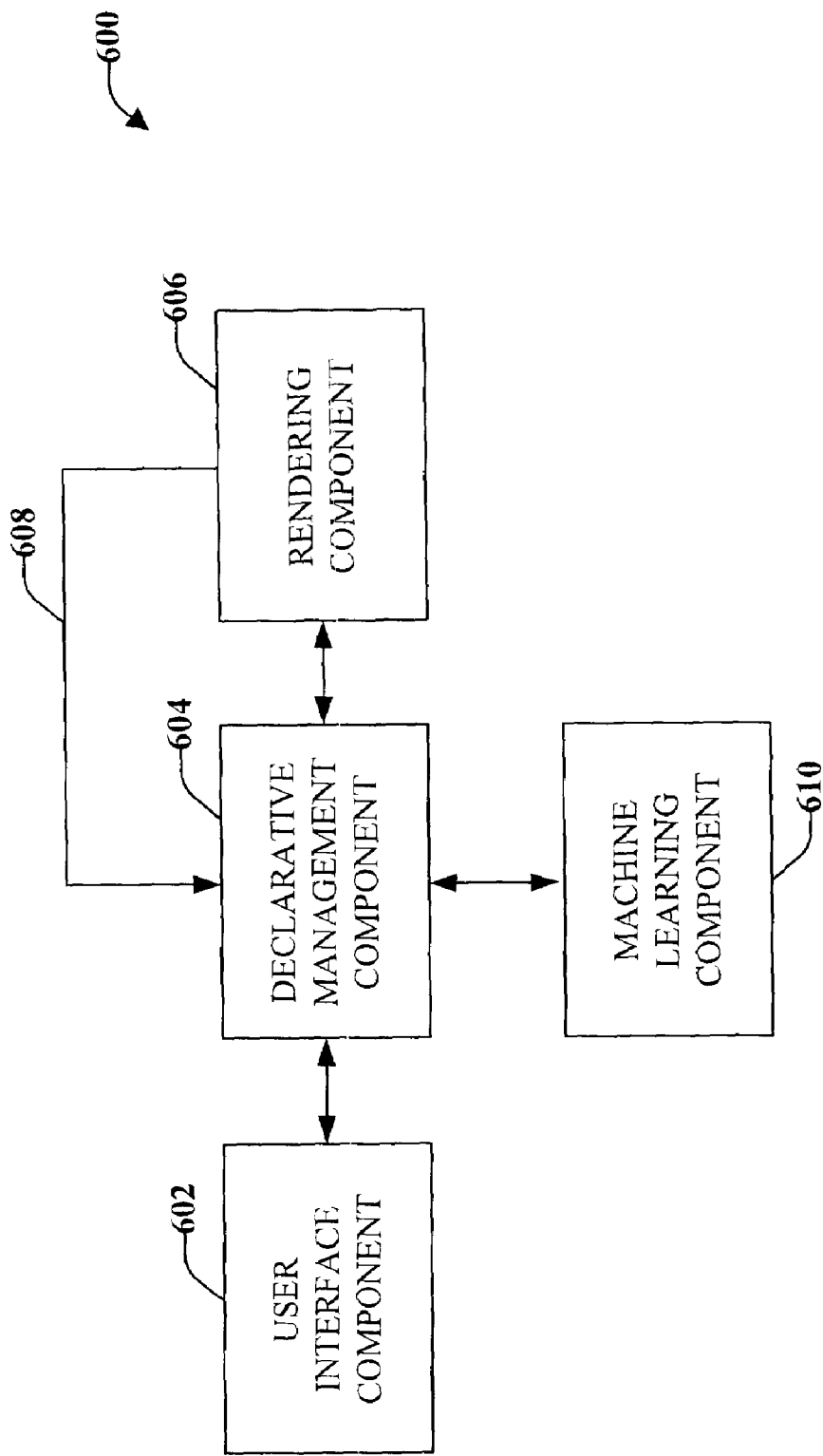
FIG. 6 illustrates a system that employs machine learning, which facilitates automating one or more features in accordance with the one or more embodiments.

FIG. 6 illustrates a system 600 that employs machine learning, which facilitates automating one or more features in accordance with the disclosed embodiments. System 600 includes a user interface component 602, a declarative management component 604, a rendering component 606, a feedback loop 608, and a machine-learning component 610. A user can input various policies, goals, or intents though interaction with the user interface component 602. This information is communicated to declarative management component 604 that interfaces with machine learning component 610 to dynamically configure system 600.

System 600 can employ various machine learning schemes for carrying out various aspects. In accordance with some embodiments, artificial intelligence can be utilized. Artificial intelligence based systems (e.g., explicitly and/or implicitly trained classifiers) can be employed in connection with performing inference and/or probabilistic determinations and/or statistical-based determinations as in accordance with one or more aspects as described herein. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

For example, an artificial process for determining if a particular target set conforms to a policy can be facilitated through an automatic classifier system and process (e.g., artificial intelligence component). Moreover, where multiple policies are requesting having the same or similar resources, the classifier can be employed to determine which policies to employ in a particular situation.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of database systems, for example, attributes can be words or phrases or other data-specific attributes derived from the words (e.g., database tables, the presence of key terms), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g. through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to configure a policy or target, which stored policies to execute, etc. The criteria can include, but is not limited to, the amount of data or applications to modify, the type of policy or target, the importance of the policy or target, etc.

In accordance with some embodiments, machine-learning component 610 can utilize a rules-based logic scheme. In accordance with this embodiment, an implementation scheme (e.g., rule) can be applied to control and/or regulate policies or low-level settings within a database or domain. It will be appreciated that the rules-based implementation can automatically and/or dynamically regulate policies or target sets based upon a predefined criterion. In response thereto, the rule-based implementation can allow, deny, and/or change a particular policy by employing a predefined and/or programmed rule(s) based upon any desired criteria (e.g., policy or target type, policy or target size, policy or target importance, database owner, user identity . . . ).

By way of example, a user can establish a rule that can require a trustworthy flag and/or certificate to access a predefined type of resource whereas, other resources within a particular database may not require such security credentials. It is to be appreciated that any preference can be effected through pre-defined or pre-programmed in the form of a rule.

Figure 7:
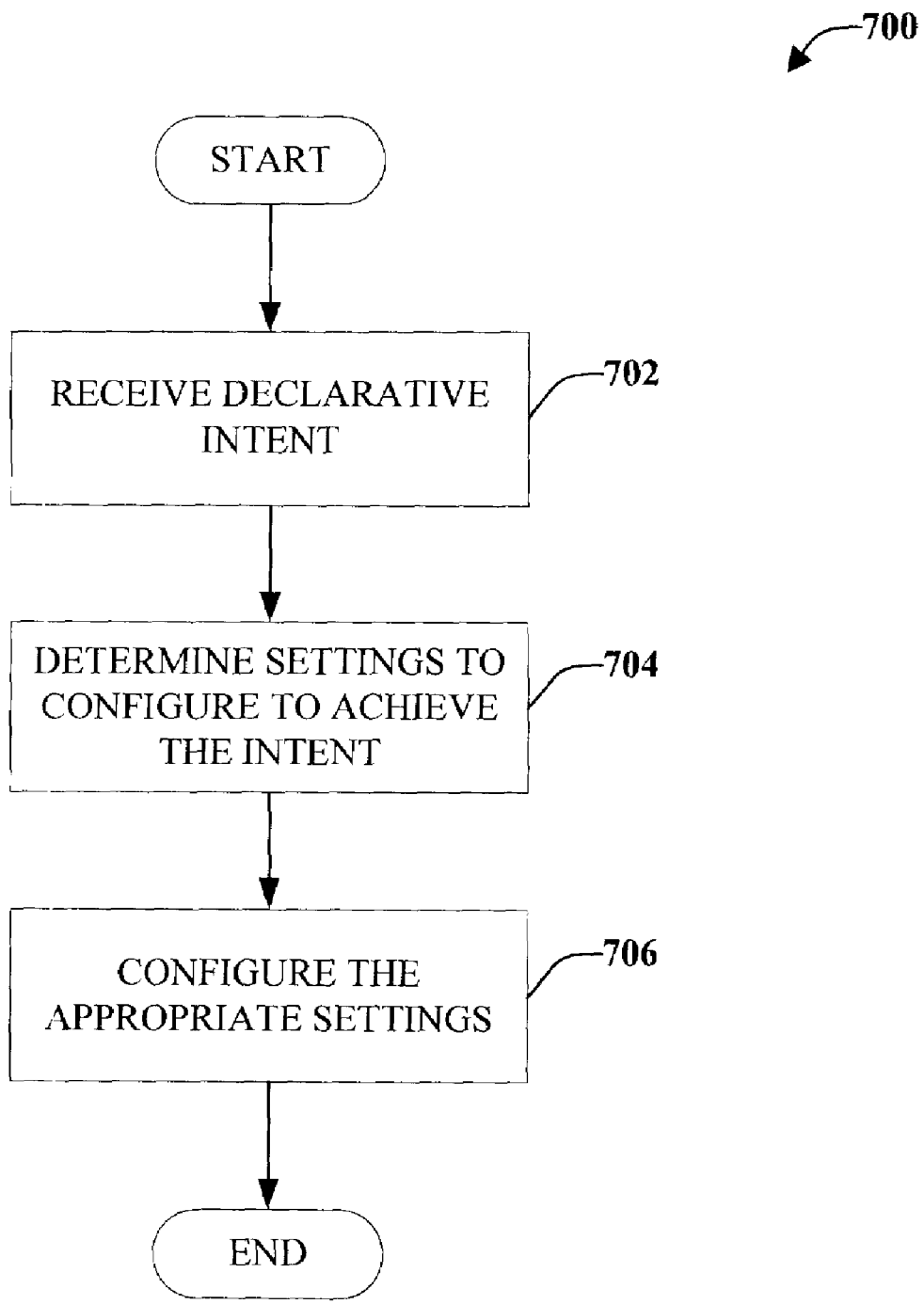
FIG. 7 illustrates a methodology for facilitating an increase in user productivity.
Figure 8:
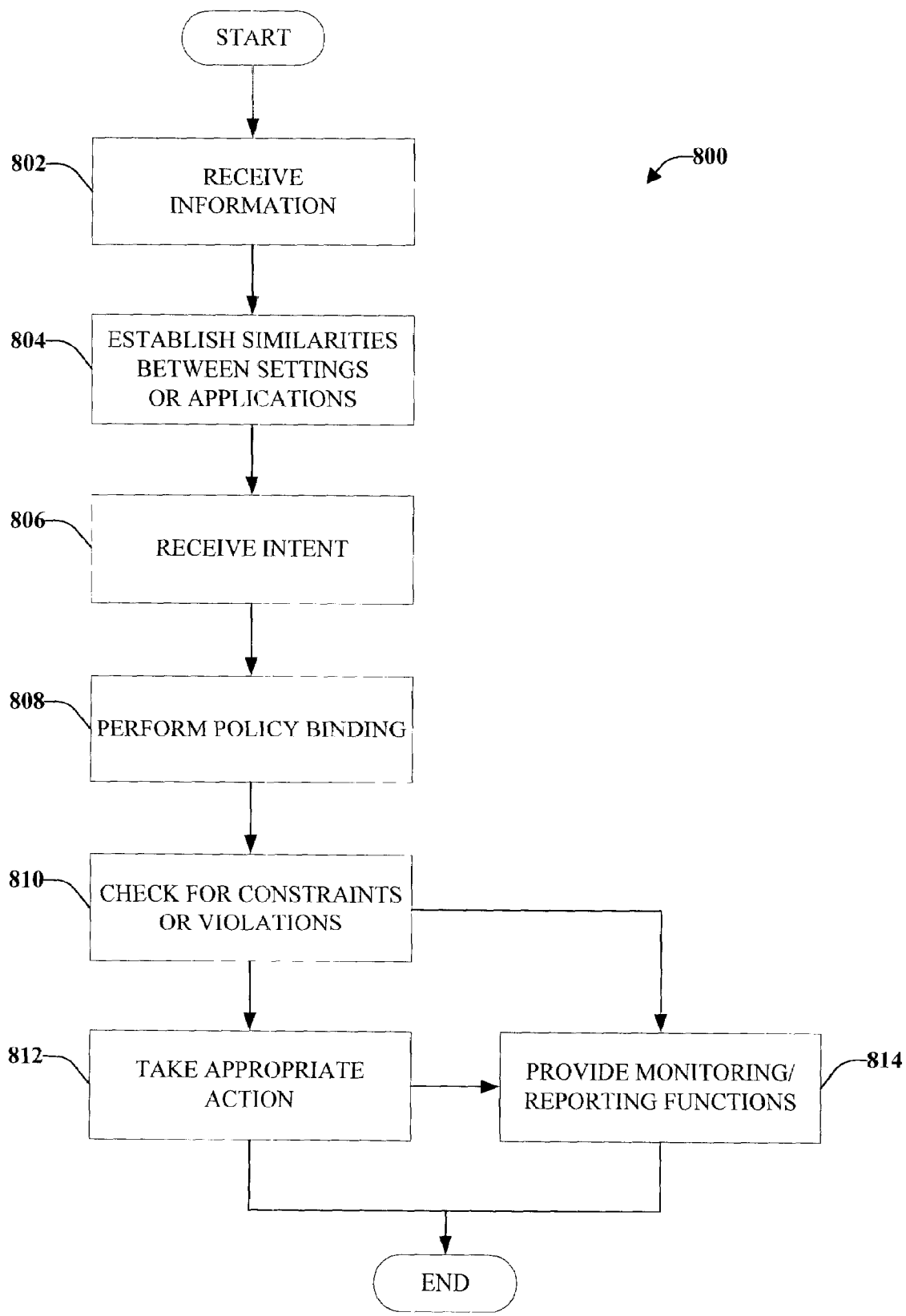
FIG. 8 illustrates a methodology for configuring a data management product.

In view of the exemplary systems shown and described above, methodologies that may be implemented in accordance with the disclosed subject matter, will be better appreciated with reference to the flow charts of FIGS. 7 and 8. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 7 illustrates a methodology 700 for facilitating an increase in user productivity. Method 700 starts, at 702, if an intent is received, such intent can be expressed in declarative language. At 704, a determination is made regarding the setting that should be configured to achieve the intent. Such settings can include high-level settings to low-level settings. At 706, the appropriate settings are automatically configured with minimal user interaction.

FIG. 8 illustrates a methodology 800 for configuring a data management product. Method 800 starts, at 802, with receipt of information, such information can include a target, a policy, a facet, a constraint as well as other information relating to a data management product. A facet can have "gets" and "sets." A constraint can evaluate a facet to a Boolean, for example. There can be one facet per constraint and one constraint per policy. A policy has behavior such as check, configure, enforce, and so on. At 804, similarities between setting and/or applications is established.

At 806 an intent is received, which can be expressed in declarative language. A policy binding that that maps policies to target sets is performed, at 808. When a policy is evaluated, actions such as email or event log entries can be triggered. In some embodiments, policies can be evaluated on a schedule. At 810, constraints or violations can be evaluated. If there is a violation, appropriate action can be taken, at 812, such as modifying a target or policy. Monitoring and reporting functions are provided, at 814, and can be reported whether or not there is a violation found at 810.

In view of the disclosed embodiments, various exemplary user interfaces and functional scenarios will be presented. The user interfaces can be provided by an interface component. For example, the interface component can provide a graphical user interface (GUI), a command line interface, and the like. For example, a GUI can be rendered that provides a user with a region or means to load, import, read, etc. the one or more intents, policies, or targets, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate information conveyance can be provided, such as vertical and/or horizontal scroll bars for navigation and toolbar buttons to determine whether a region will be viewable can be employed. For example, the user can interact with the system by entering the information into an edit control.

The user can also interact with the regions to select and provide information through various devices such as a mouse, a roller ball, a keypad, a keyboard, a pen and/or voice activation, for example. Typically, a mechanism such as a push button or the enter key on the keyboard can be employed subsequent entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt (e.g., by a text message on a display and an audio tone) the user for information by providing a text message. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 9:
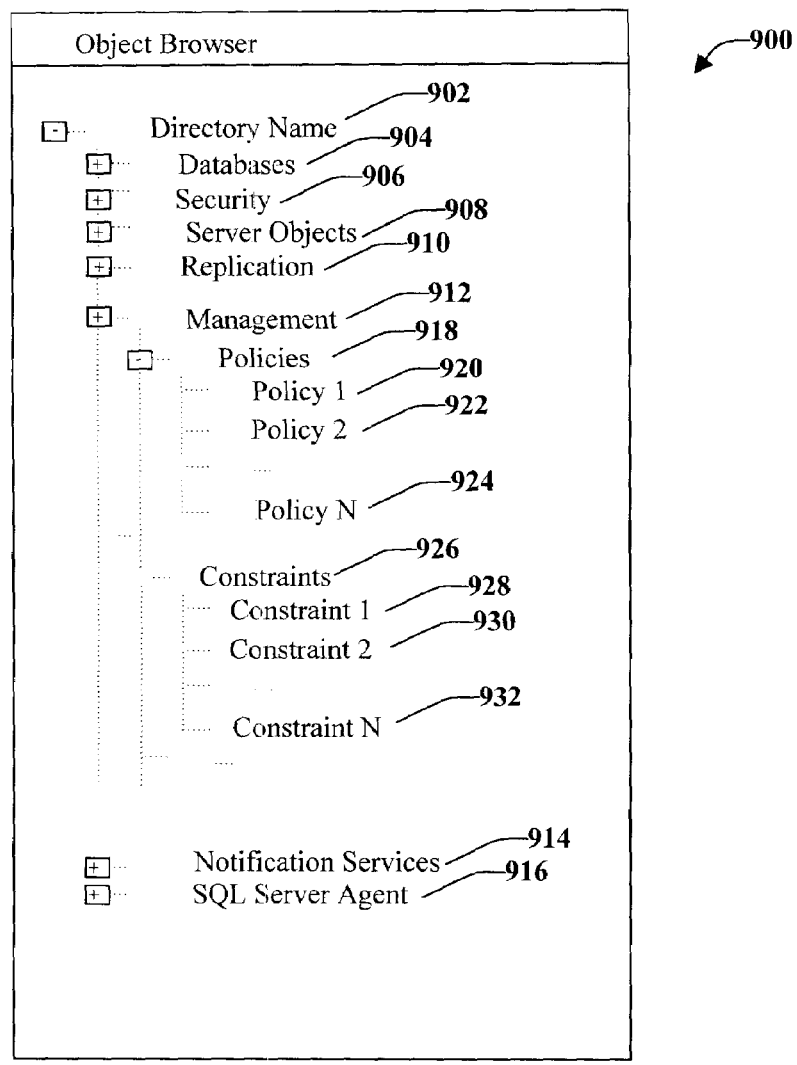
FIG. 9 illustrates an exemplary screen shot of a user interface.

With reference now to FIG. 9 illustrated is an exemplary screen shot of a user interface. An object browser 900 is illustrated that can facilitate searching and choosing a policy or constraint Object browser 900 can provide various selections for a user to manipulate parameters of policies or constraints. A directory 902 can be selected that includes sub-directories such as database(s) 904, security 906, server object(s) 908, replication 910, management 912, notification service(s) 914, server agent 916, and other desired sub-directories. Each sub-directories 904-916 can have further sub-directories, as indicated by the plus "+" sign located to the side of each sub-directory 904-916, which indicates that the directory is expandable. The management sub-directory 912 is selected, as indicated by the minus "−" sign next to the selected directory, indicating that the directory can be compressed or unexpanded.

Under the management sub-directory 912 can be a policies sub-directory 918 that can include a multitude of policies, such as Policy 1 920, Policy 2 922, and Policy N 924, where N is a number greater than or equal to zero. Management sub-directory 912 can also include a constraints sub-directory 926 that can include a multitude of constraints, such as Constraint 1 928, Constraint 2 930, and Constraint N 932, where N is a number greater than or equal to zero A single server can be managed in an automated manner in accordance with the various embodiments. To perform various actions (e.g., view, create, edit, delete, apply, import, and so on) on a policy binding, binding, constraint, or facet (e.g., node) the user can select the desired item from the drop down list in the object browser 900. The target node can be selected by highlighting the node and using the right button on a mouse (or equivalent function) to select the desired action.

For example, to perform various actions on policy bindings, the user can select the node (e.g., highlight node and depress right mouse button). From a drop down menu and a link, such as, "policy binding management" can be chosen to invoke a "policy binding property" window or screen. To view the policy bindings, a "deployed policies" tab can be selected (e.g., clicked on with mouse button). Deployed policies allow the user to view the policy bindings deployed either on the node or on its descendents. To view the effective policy bindings on the node, the user can select the "effective policies" tab from the "policy binding management" drop-down menu.

The "policy binding management" drop-down menu also allows the user to create, edit, or delete a policy binding. To create a policy binding the "New" button is selected that can invoke a "Policy Binding Properties" window or user screen. The policy can be chosen from a combination box and a schedule can be chosen, if desired. To create the chosen policy binding, the user can accept the changes (e.g., clicking on an "okay" button).

To edit a policy binding, "the policy binding to be edited can be selected (e.g., highlighted) and an "Edit" button can be selected (clicked) to open the "Policy Binding Properties" window for editing. To delete a policy binding, the policy binding to be deleted can be selected (e.g. highlighted). To delete the selected policy binding, a "delete" button can be clicked or selected.

Figure 10:
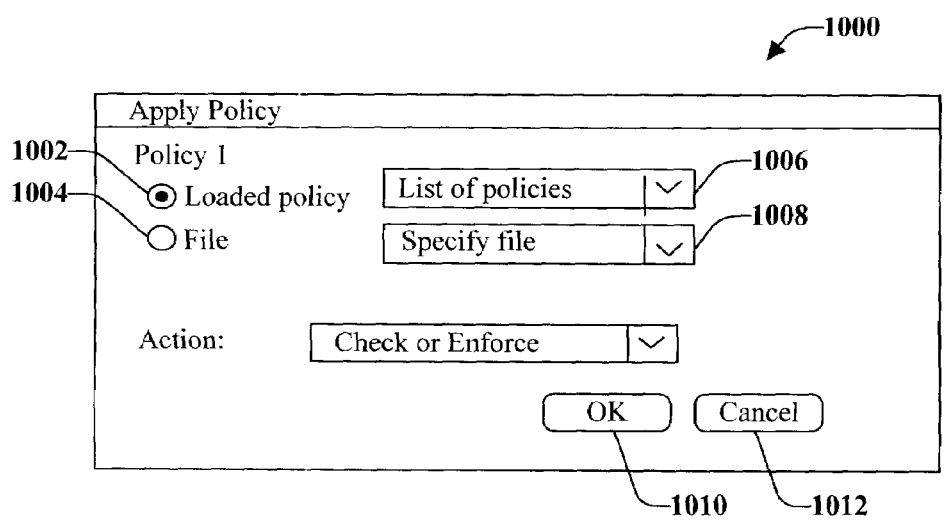
FIG. 10 illustrates an exemplary user interface for applying a policy.

FIG. 10 illustrates an exemplary user interface for applying a policy. In ad-hoc administration, a policy can be applied by selecting the target node either in the object browser 900 or in a registered server pane. From a drop-down menu "Apply Policy" can be chosen to invoke the apply policy window 1000.

A decision is made whether to select a loaded policy 1002 or a policy file 1004 and the desired action can be chosen. As illustrated, loaded policy 1002 is selected. A drop down menu can be provided for choosing a specific policy from a list of policies 1006 or to specify a file 1008. Choosing or clicking an apply or ok button 1010 can apply the policy. Choosing the cancel 1012 button cancels the entire action and closes the apply policy window 1000.

To perform actions (e.g. view, create, edit, delete, import) in regard to policies the policy can be selected from the object browser 900 and the appropriate action chosen from a drop down menu that is invoked by right-clicking a mouse button. Choosing "New" invokes a "Policy Properties" window. To edit a policy, the desired action can be chosen and, from a combo box, a desired constraint can be chosen, or a new constraint can be created. To accept the changes, an accept or okay button can be selected (e.g., clicked).

To delete a policy, the policy is selected (e.g., right click) and from a drop-down menu, "Delete" is selected. To import a policy, "Import" is selected from a drop down menu to invoke an "Import Policy" window. The desired policy file is chosen and the "OK" button is selected.

Actions can be performed on constraints in a similar manner. From the object browser 900 the constraint is selected. To create a constraint "New" is chosen from a drop down menu to invoke the "Constraint Properties" window. The desired management facet is chosen and the "New" button is clicked to add a new expression row. For an expression row, the "property operator value" expression is constructed. To delete a row, an expression row can be highlight and a "Delete" button pressed. Clicking an "OK" button closes the window.

A constraint can be edited by invoking the "Constraint Properties" window. A different management facet can be chosen. Clicking the "New" button adds a new expression row. An expression row can be deleted in a similar manner as described above. For an expression row, the user can edit the property, operator and value. Selecting an "OK" button submits the changes.

FIG. 11 illustrates an exemplary user interface 1100 for policy properties, and, in this case, the policy is "highSecurity". A user configurable name 1102 can be selected or entered as well as a description of the policy 1104. An action can be selected from a drop down menu 1106. Such actions can include creating a new policy, editing a policy, deleting a policy, or the like. A constraint can be chosen from a drop down constraint list 1108. A drop down list 1110 that includes state interfaces is available for each facet. The constraint 1108 and facet 1110 should be enabled only for appropriate actions. A new button 1112 can be chosen to add a new constraint 1108 or facet 1110.

Various other types of information can be captured including the owner of the policy 1114, a creation date 1116, and a last modified date 1118. The user can select cancel 1120 to delete actions and close the window 1100. Selecting the OK button 1122 accepts the current changes and closes the window 1100.

FIG. 12 illustrates an exemplary user interface 1200 for constraint properties. The interface can provide a means for naming 1202 or selecting a constraint. A management facet 1204 can be selected from a drop down menu that contains a listing of facets. A table or list can be provided that allows the user to choose various properties 1206, operators 1208, and values 1210 for each constraint. Such selection can be made from drop down menus or by directly entering the information in the table. The table should allow editing, adding, and deleting of properties. The user can select cancel 1212 to delete actions and close the window 1200. Selecting the OK button 1214 accepts the current changes and closes the window 1200.

Figure 13:
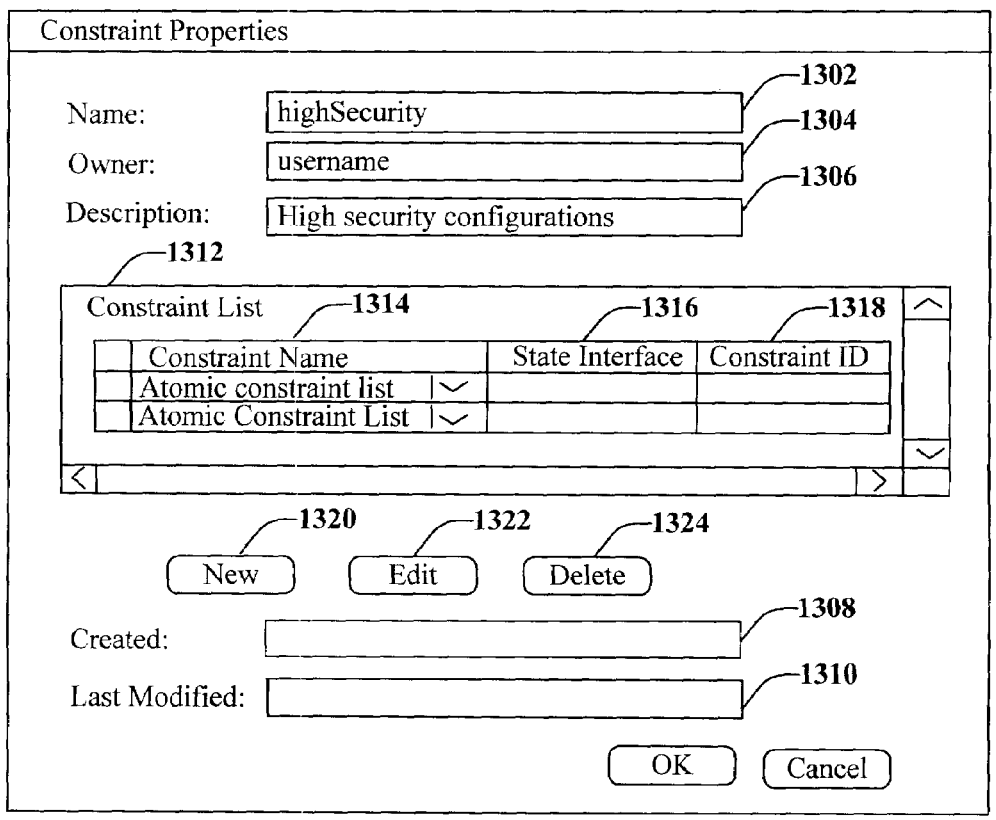
FIG. 13 illustrates another exemplary screen shot of a user interface for constraint properties.

FIG. 13 illustrates another exemplary screen shot of a user interface 1300 for constraint properties. A property name 1302, owner name 1304, description 1306, date created 1308 and date last modified 1310 can be provided or defined by system and, in accordance with some embodiments, the user cannot modify these fields. From a constraint list table 1312, a user can chose and define a constraint name 1314, a state interface 1316, and a constraint identification 1318. The user can create a new constraint, edit a constraint, or delete a constraint by choosing the appropriate action button 1320, 1322, or 1324.

Figure 14:
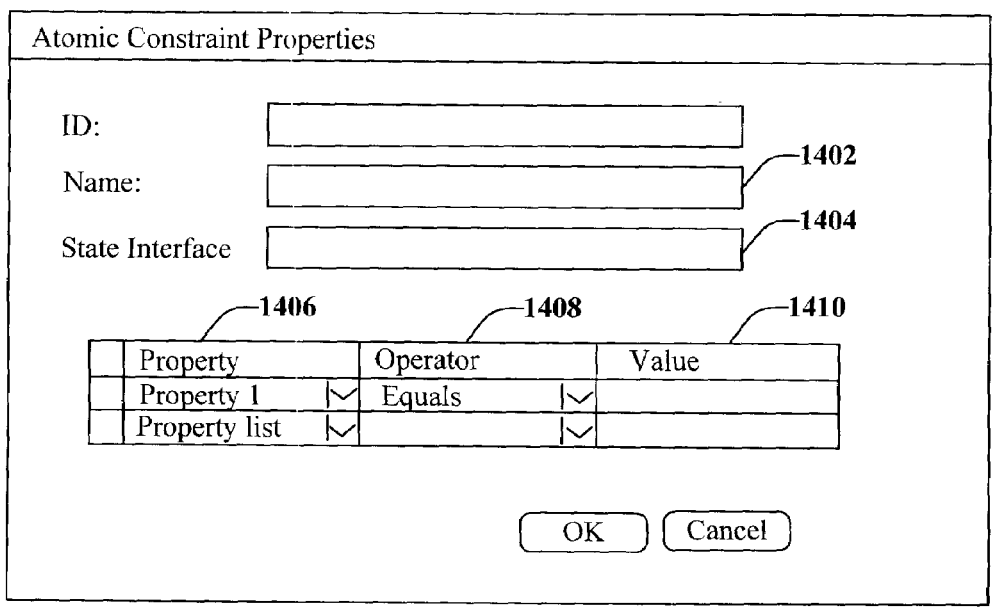
FIG. 14 illustrates an exemplary user interface for atomic constraint properties.

FIG. 14 illustrates an exemplary user interface 1400 for atomic constraint properties. A constraint name 1402 can be chosen and a state interface picked from a drop down menu that includes a listing of state interfaces 1404. A table or list can be provided that allows the user to choose various properties 1406, operators 1408, and values 1410 for each constraint. Such selection can be made from drop down menus or by directly entering the information in the table.

Figures 15, 16:
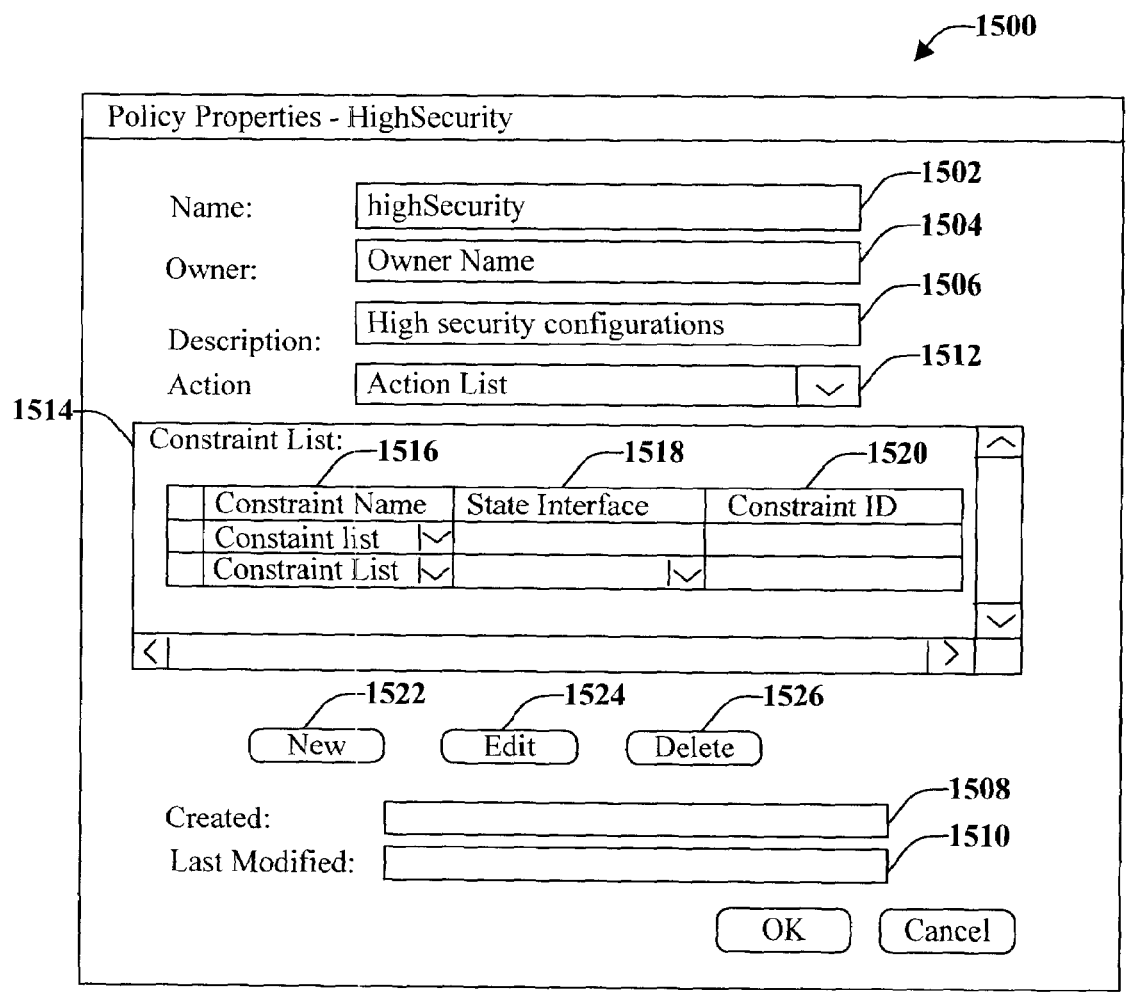
FIG. 15 illustrates an exemplary screen shot of a user interface for policy properties.
FIG. 16 illustrates an exemplary user interface for displaying (or printing) a policy execution report.

FIG. 15 illustrates an exemplary screen shot of a user interface 1500 for policy properties. Fields such as property name 1502, owner name 1504, description 1506, date created 1508, and date last modified 1510 can be defined by system and, in accordance with some embodiments, the user cannot modify these fields. An action can be chosen from a drop down action list 1512. From a constraint list table 1514, a user can chose and define constraint name(s) 1516, state interface(s) 1518, and constraint identification(s) 1520. The user can create a new policy, edit a policy, or delete a policy by choosing the appropriate action button 1522, 1524, or 1526.

FIG. 16 illustrates an exemplary user interface 1600 for displaying (or printing) a policy execution report. A similar user interface can be utilized for displaying (or printing) a policy execution history. Included is a date 1602, such as the date and time of a violation. Also provided is an identification 1604 of the policy, and the policy name 1606. The result 1608 is also displayed and can be displayed in a different color (such as red) to draw attention to the result, such as for a violation. Other results can include conformance to a policy, changes to a policy, and the like. A message 1610 can also be provided that can relate to the result. The list can be sorted on any column 1602-1608 to display multiple policies in different sorting orders.

With reference now to FIG. 17, illustrated is an exemplary policy instance management user interface 1700. This interface can be invoked by choosing a "Policy Deployment" menu. User interface 1700 can include a table 1702 for viewing and selecting action(s) 1704 (e.g., check compliance, modify for compliance, . . . ). A status 1706 can also be modified or viewed. For each policy 1708, a schedule 1710 can be selected, which can be user defined or based on other scheduling criteria. The history 1712 of the schedule can be viewed to allow the user to perform various operations with respect to the given policy 1708.

FIG. 18 illustrates an exemplary user interface 1800 for deployed policy properties. Interface 1800 can include a drop down menu 1802 for choosing a policy. Schedules can also be chosen from a drop down list of schedules 1804. Various other fields can be automatically entered, such as name of the constraint 1806, action 1808, target set 1810, identification 1812, owner name 1814, description 1816, date created 1818, date last modified 1820, and date policy last executed 1822.

The user can select whether to recursively check all descendents by selecting the check box 1824. Such selection should be shown when the action of the policy is to check on schedule. The user can also select whether the policy is enabled 1826. If this check box is not checked, the policy is disabled. The report history 1828 can be viewed from this screen and can be printed or saved for further analysis.

Figure 19:
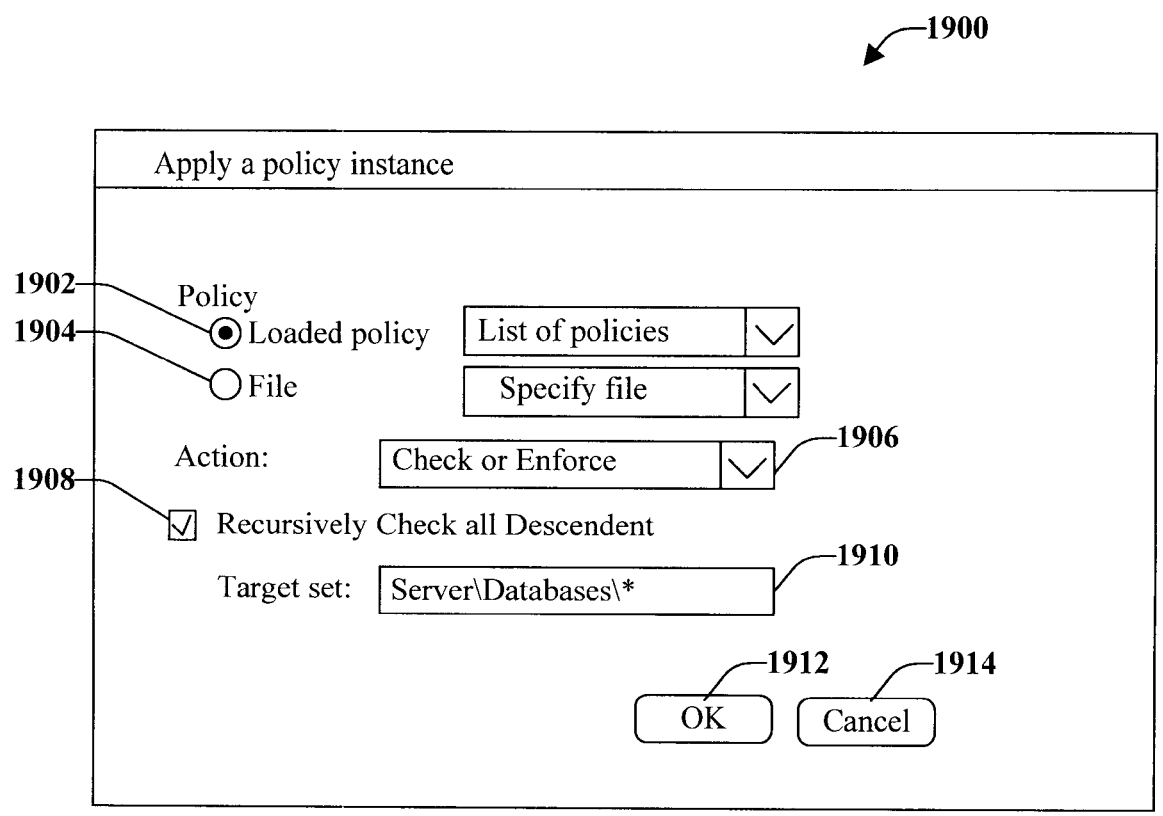
FIG. 19 illustrates an exemplary user interface for applying a policy instance.

FIG. 19 illustrates an exemplary user interface 1900 for applying a policy instance. Selecting an action, such as "apply policy instance" can invoke this user interface 1900. A decision is made whether to select a loaded policy 1902 or a policy file 1904 and the desired action can be chosen. As illustrated, loaded policy 1902 is selected. A drop down menu can be provided for choosing an action from a list of actions 1*p*06 (e.g., check or enforce). A check box 1908 can enable a recursive check on all descendents. A target set location 1910 can be provided by system. Choosing or clicking an apply or okay button 1912 can apply the policy. Choosing the cancel 1914 button cancels the entire action and closes the apply policy instance window 1900.

Figure 20:
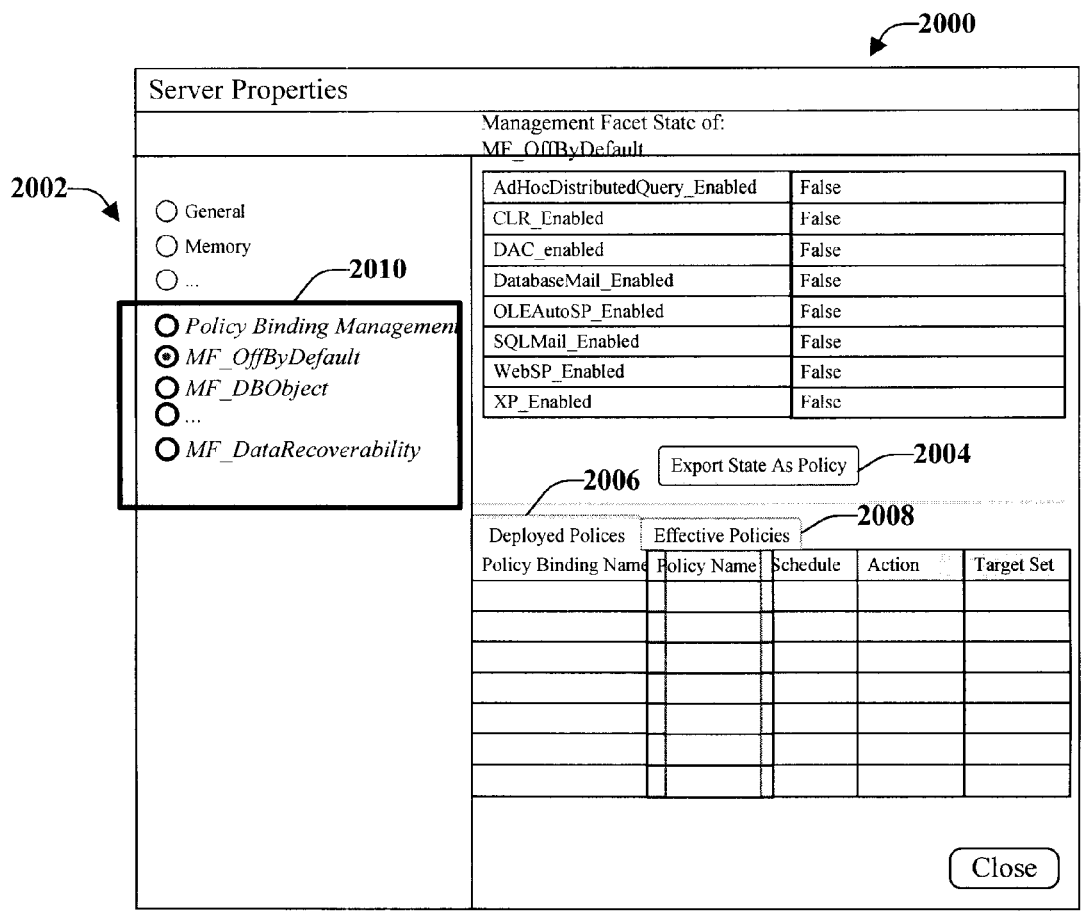
FIG. 20 illustrates an exemplary user interface for server properties.

FIG. 20 illustrates an exemplary user interface 2000 for server properties that can be utilized with multi-server management. Management facets can be viewed by right clicking the target node. Choosing "Properties" in the drop down menu invokes the "Properties" window. The management facets can be listed in the left pane 2002, for example. Clicking a facet allows the user to view its current state and management facets can have attributes for readable names.

To extract the state of a management facet into a policy file, the "Properties" window 200 is opened and the facet is chosen. Clicking the "Extract to policy" button 2004 exports the state into a policy file. A similar button can be utilized to import policy bindings. A selection can be made whether to view deployed policies 2006 or effective policies 2008. Deployed policies 2006 tab allows the user to view the policy bindings deployed either on the node or on its descendents.

The desired file name can be entered into a dialogue box. A "Save" button saves the changes and closes the window. Policy bindings on a facet can be viewed through the "Properties" window and clicking the "Deployed Policy Bindings" tab to view the policy bindings deployed on the node and the facet. Clicking the "Effective Policy Bindings" tab allows the user to view the effective policy bindings on the node and the facet.

Figure 21:
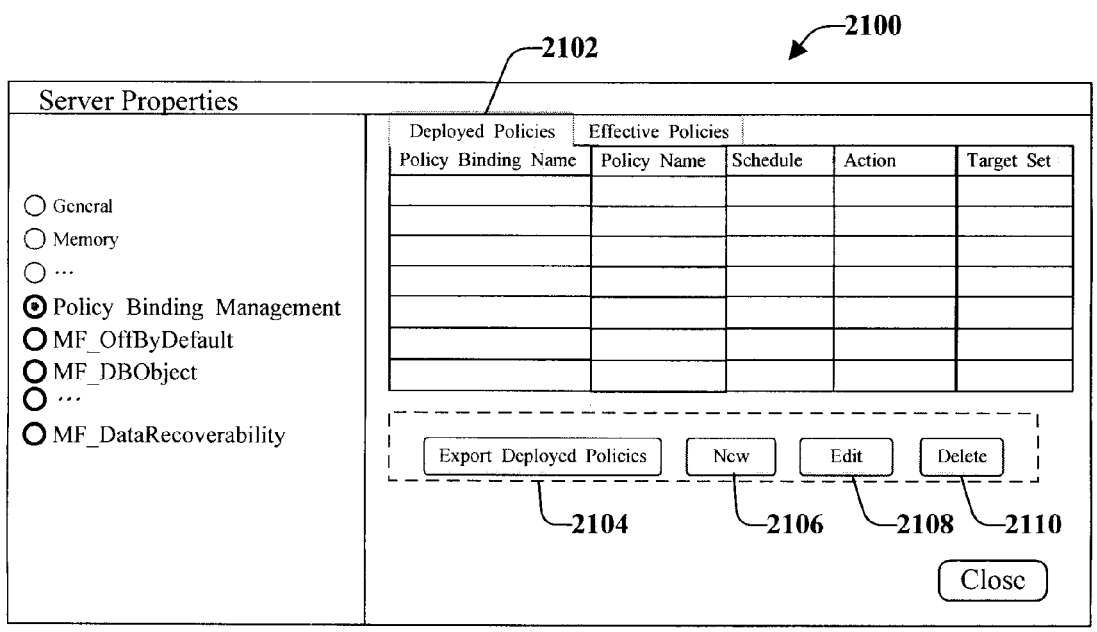
FIG. 21 illustrates another exemplary user interface for server properties.

FIG. 21 is another exemplary user interface 2100 for server properties that can be utilized with multi-server management. User interface 2100 is similar to the user interface illustrated in the above figure. When deployed policies 2102 are selected, the user is provided various buttons for performing actions. The deployed policies can be exported 2104. A new policy can be created or an existing policy can be edited or deleted by selecting the appropriate button 2106, 2108, 2110.

Various scenarios will be presented to illustrate various features. The following is an example of pulling a management facet together. Connect to relational server and visit the server to view the state of the OBD facet. The state can be exported as a policy. A user can walk up to (or open) a different server and evaluate the policy (e.g., see violations). The policy can be enforced on the service. To explicitly check a server group from SQL Server Management Studio (SSMS), a user can visit the registered servers pane and Check an Off-By-Default (OBD) policy against the group. A report can be presented with the results and the policy can be enforced on the group.

Automation through scheduled checking can be provided by importing an OBD policy to a server and visiting the OBD policy node. The properties of the OBD policy can be viewed to see if the action is "Check on schedule". The policy is deployed and a binding with scheduled checking is created. The report(s) are checked. The management facet state of the server can be changed, and the reports checked.

A naming policy can include creating a policy with respect to name prefixes that can be checked against a database. The policy can be deployed and an "enforcement" binding created. A change can be made on the server, which the policy can prevent. A BPA policy can include BPA rules (checking) in SSMS.

Scalability and Performance can include Scalability from data-driven policy binding (for group policies). Two policies can be deployed on one server (e.g., OBD policy with scheduled checking, naming policy with enforcement. Policies and bindings from one server can be replicated on another. Policy bindings can be checked to see if the are effective on the second server (e.g., change OBD settings and view violation report, make a change on the server and to determine if the Naming policy prevents the change). A policy changed on the first server can be observed for its effect on the second server.

Scalability from export/import binding: Deploy two policies on one server, such as OBD policy with scheduled checking and naming policy with enforcement. Next, export policy bindings information file from the server node. Walk to another server and import the policy binding file. Check that policy bindings are effective on the second server, such as change OBD settings and view violation report and/or make a change on the server and show that the naming policy prevents the change.

Figure 22:
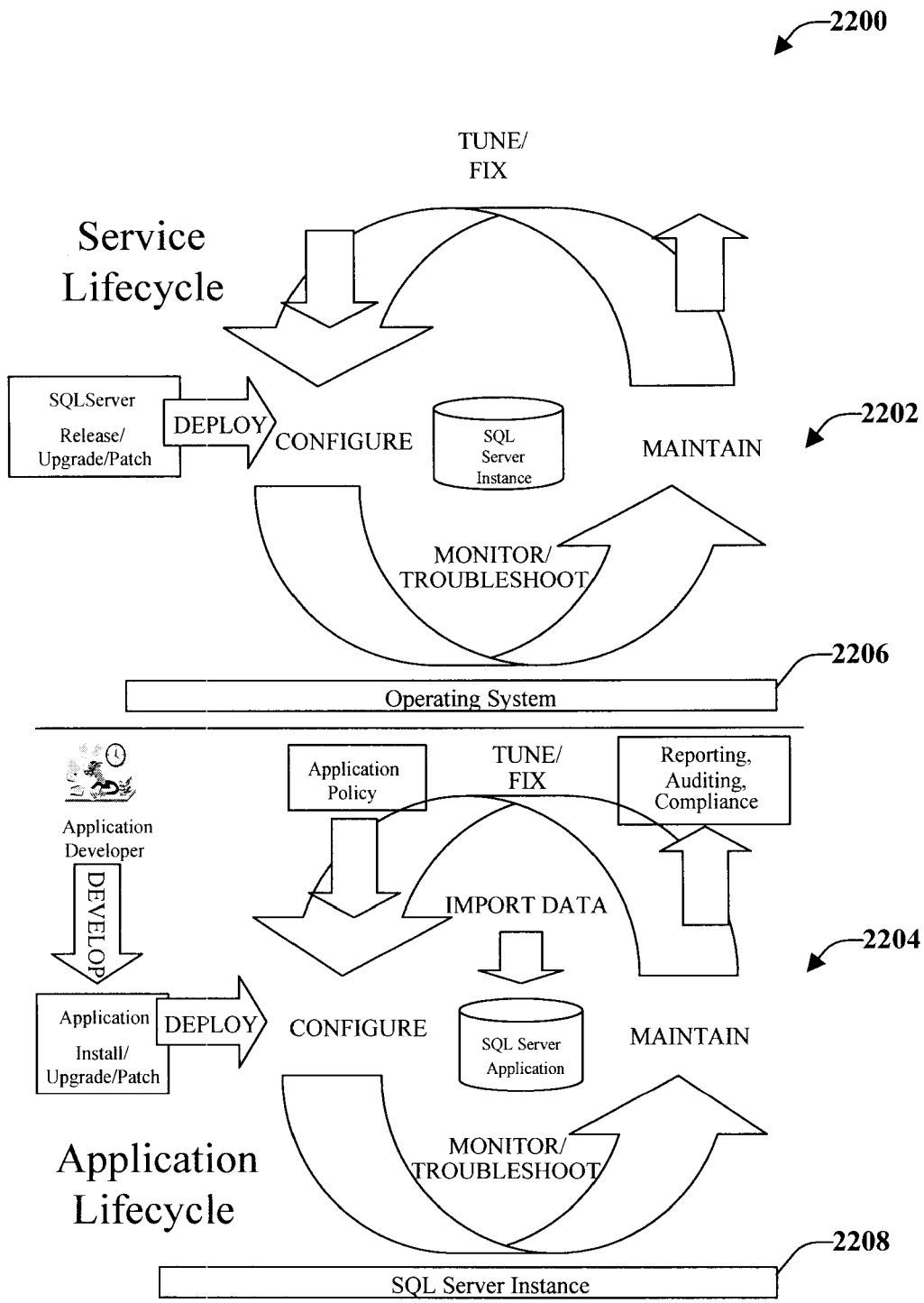
FIG. 22 illustrates an exemplary system lifecycle.

FIG. 22 illustrates an exemplary system lifecycle 2200. The disclosed technique can capture administrative intent as high-level policy at a logical level that the system can interpret. Scalable management allows the system to apply a policy to many applications, instances, and/or servers. Self-management can lead to problem detection, resulting in automated administration. Thus, the system can make sensible default policies available. A consistent integrated management infrastructure can manage all data management products (e.g., SQL) services uniformly. It can also work down level, supporting the management capabilities against SQL Server 2000 and SQL Server 2005 servers, for example. It can also be integrated with other technologies, including, but not limited to, MOM, Dynamic Systems Initiative (DSI), Visual Studio, and the like). It can also support deep diagnostics and tools for quick problem resolution, and, thus, aligned with supportability.

The top portion illustrates the service lifecycle 2202 and the bottom portion illustrates the application lifecycle 2204. These can represent, for example, an operating system 2206 and a server instance 2208. Development and deployment lead to configuration. The systems are monitored and problems found, if any, and the system is maintained. This can lead to reporting, auditing, and compliance.

Policies can be utilized to configure the data management product (e.g., SQL Server). For example, instead of authoring T-SQL scripts, policies can be used to perform the initial configuration. Policies can check the server configuration against specific configurations. As such, polices can be released that represent best practices for server configurations and the user can compare their environment against the reference (best practice) polices. Special handling of policy events can be provided as well as extended declarative management.

The following sample policies are included for example purposes only. Surface Area Configuration:
SurfaceArea.CLR==true &&
SurfaceArea.SQLMail==false&&
SurfaceArea.DBMail==true
Name Constraints:
Table.name like "XY_*"
Analysis Services Patch Level:
As.Major==90 && as.Minor==0 && as.BuildNumber>=2550
Backup:
Db.RecoveryModel==simple && (DateTime.Now-db.DifferentialBackupDate)<
1 && (DateTime.Now-db.FullBackupDate)<30
Server CPU Utilization
SQLServer.HostCPUUtilization<80%

A traditional database application includes a database and a client machine that interface with a client API, for example. The application is coupled to a database schema wherein the application is considered in terms of rows and tables or an embedded SQL. Traditionally data services were limited (e.g., get, put, delete, query) with validation and constraint enforcement in the application. In a client-server architecture the application is usually connected with the database. The disclosed embodiments can provide multi-tier, distributed, disconnected, and mobile systems. It is distributed with respect to devices, desktop (computers), servers, clusters, cloud. Data can move across tiers and is processed close to application. The data can be federated from multiple data sources. It can occasionally be connected to applications. The disclosed embodiments can provide richer types of data and higher data abstractions. It can also provide dynamic data (e.g., business process state, messages, and business rules.

The following lists some elements of the disclosed embodiments. Multi-tier, disconnected (occasionally connected), distributed, SOA based (for example), open, interoperative, devices, tables, desktops, service, dynamic (data, application mobility), multiple data sources, information based, model driven, componentized, customizable and adaptable.

The disclosed embodiments can have four levels of abstraction: physical, logical, conceptual, programming or presentation. Physical refers to record formats, file extents, file groups, indexes, and file partitions. Applications can be unaware of the physical level. The logical level includes tables, keys, PK/FK constraints, normalization, physical data independence, relational applications. The conceptual level includes entities, relationships, constraints, shift in future applications, target model for a data platform. The programming or presentation level has no universal programming mode. It includes entity values, objects, XML and most applications should transform among these.

When a user creates a database application, they are creating objects inside a database and may also create objects at the server level. A database can include a table(s) and various objects and can be a server that can have multiple databases. The tables and views are included in the database. There can also be objects that exist at the server level. A user can create their own custom server error messages or create at an SQL Server, for example, a server level. The disclosed embodiments provide the user a means to obtain a system or application view of the server. This view can be provided regardless of whether the server has one database, multiple databases that may belong to one particular application, or multiple applications that have objects inside the same database.

The user can request, such as through an interface component, to view the server of an application "A" (e.g., with a rendering component), and a policy can be created on application "A" (e.g., with a declarative management component). For example, the user requests that all database tables for application "A" should start with AppA_. If a new table is created, the policy specifying that the table starts with AppA_ is in effect and will be applied to the new table. The system automatically performs the deployment whether it is on one database or more than one database. Thus, minimizing the amount of user interaction.

Figure 23:
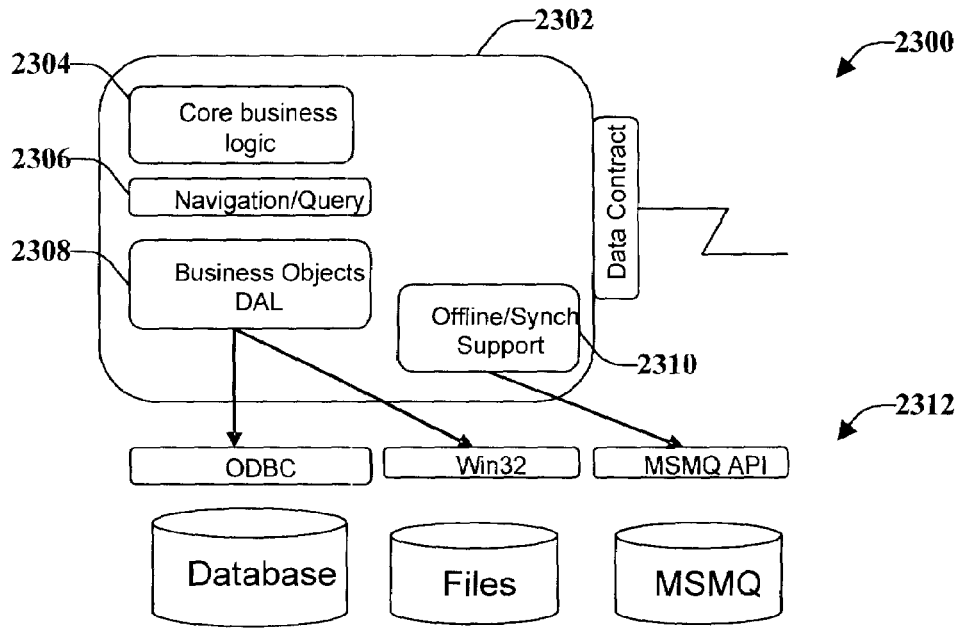
FIG. 23 illustrated is an exemplary system.

With reference now to FIG. 23 illustrated is an exemplary system 2300. System includes an application 2302 that includes a core business logic 2304. A navigation/query 2306 can be a data management service. Data mapping services can be business objects 2308 and offline/synchronization support 2310. Store interfaces 2312 are also provided. The applications deal in terms of entities and there are many data mapping solutions with an application. Impedance mismatch is provided wherein applications can write their own navigation/query/transformation information.

Figure 24:
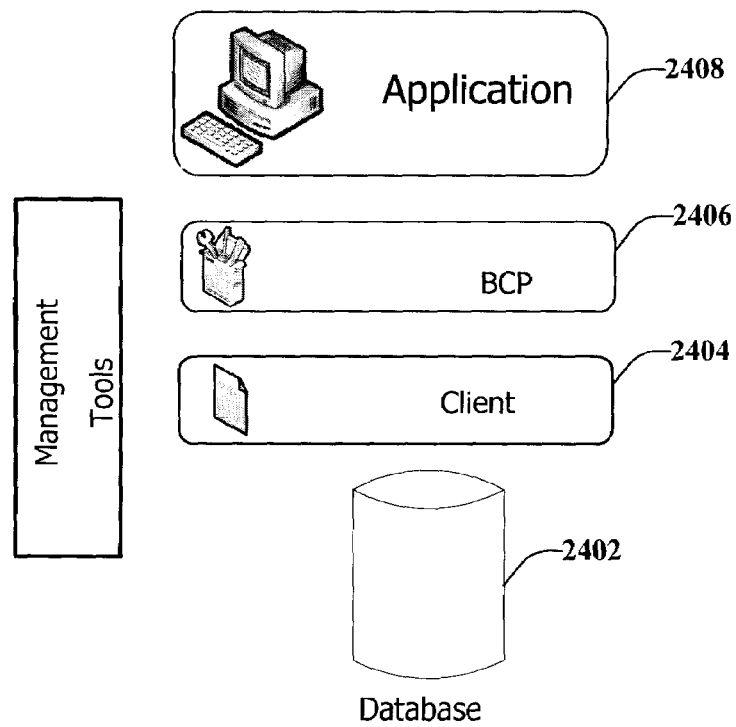
FIG. 24 illustrates exemplary management tools.

With reference now to FIG. 24 illustrated are exemplary management tools that include a database 2402, a client API 2404, a BCP 2406, and an application 2408. A data management product can be a core relational engine that includes client libraries, data utilities (e.g., BCP 2406) and management tools. Each service can communicate rows and tables.

Figure 25:
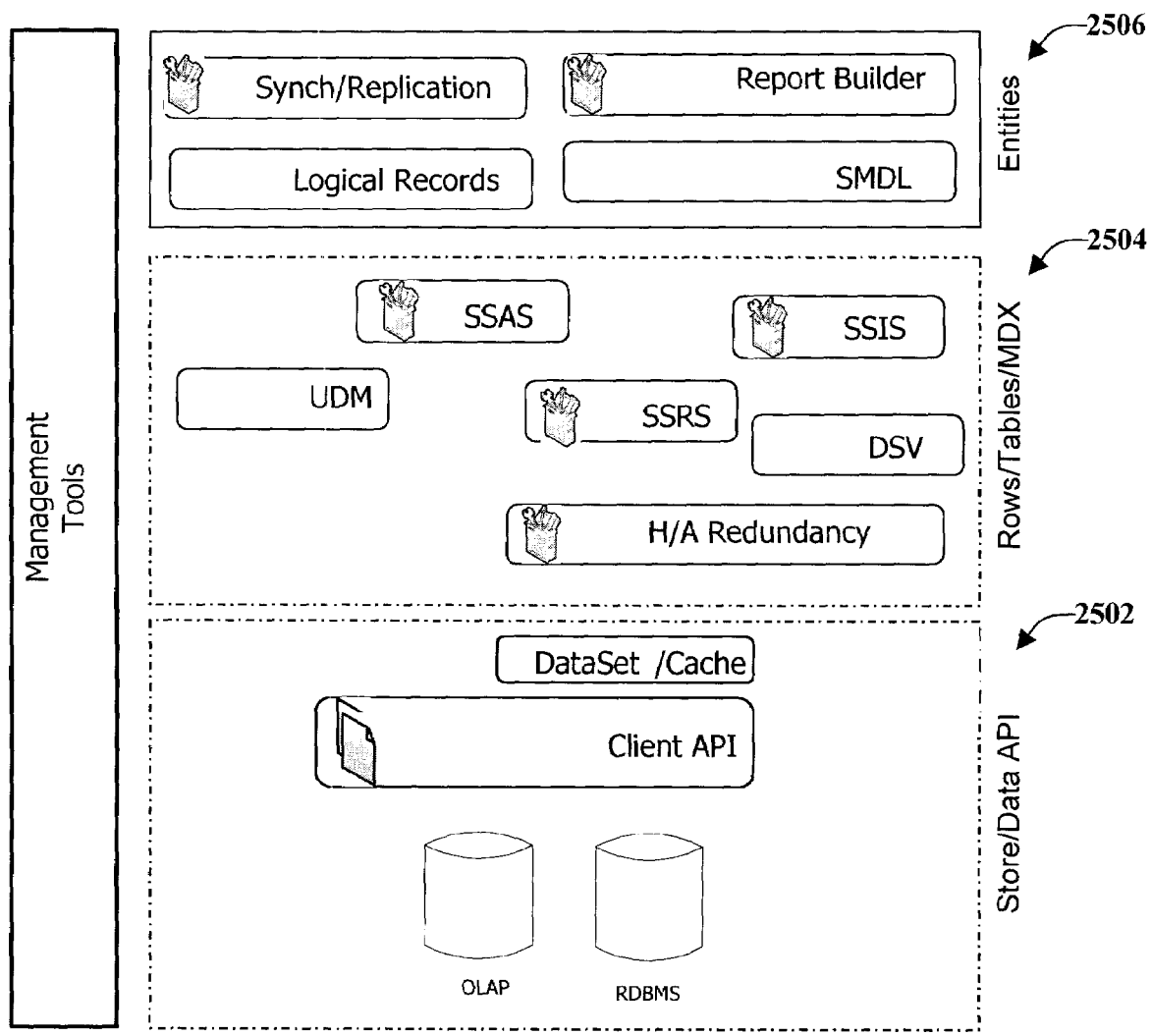
FIG. 25 illustrates a system that provides data services operating on in an ad-hoc fashion.

FIG. 25 illustrates a system 2500 that provides data services operating on entities (e.g. reporting, merge, replication) in an ad-hoc fashion. Included is a store/data API 2502 portion, a rows/tables/MDS portion 2504, and an entities portion 2506. System 2500 provides various implicit and explicit mapping layers and mapping descriptions.

Figure 26:
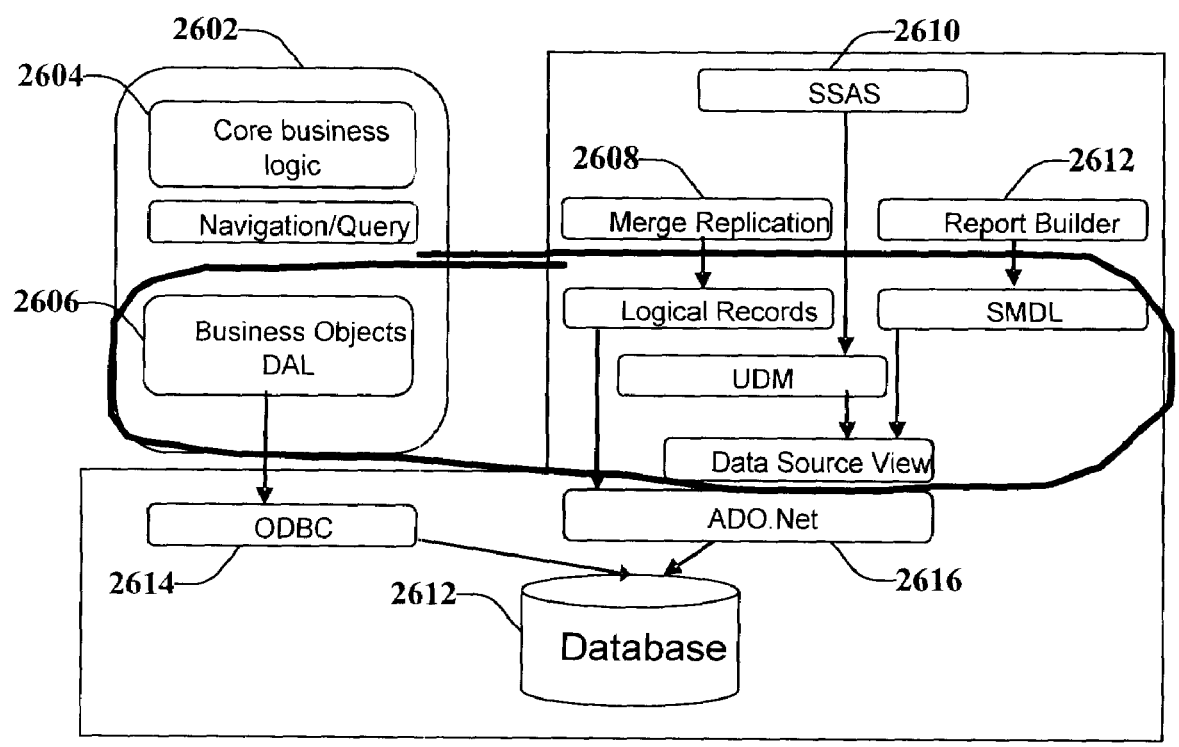
FIG. 26 illustrates a data platform.

A data platform is illustrated in FIG. 26. An application 2602 includes a core business logic 2604. A data management service (e.g., navigation/query) 2606 is also included. Value data services include a merge replication 2608, a SSAS 2610 and a report builder 2612, as well as other components. Store interfaces include an ODBC 2614 and an ADO.NET 2616 that interact with a database 2618. Application can build entities in their DAL layer (e.g., customers, accounts and the like). Value data services 2608, 2610, and 2612 can work on entities (e.g., have independent method of describing).

Figure 27:
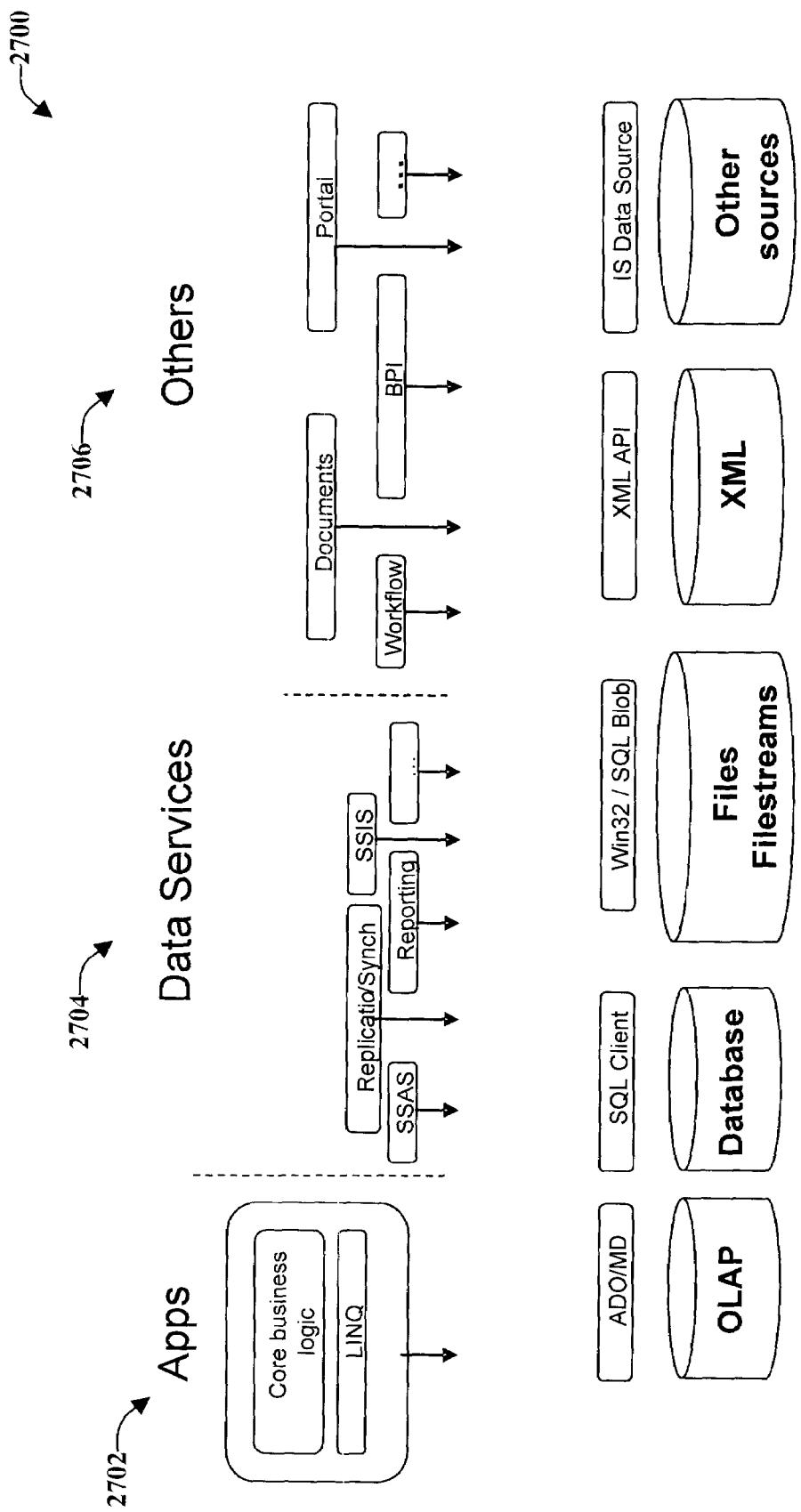
FIG. 27 illustrates another data platform.

FIG. 27 illustrates a data platform 2700 that includes applications 2702, data service 2704, and other items 2706. A structure of data can be defined one (e.g., entities). For example, the terms "Asset", "Customer", and "Account" can be defined and then used throughout the entity bus. A virtuous cycle in data services can be provided which include defining an "Asset", building a share point asset tracking application, creating workflow to e-mail form to update assets status, and creating reports of asset status. Other within the company or enterprise and in an ecosystem can connect to the bus.

Figure 28:
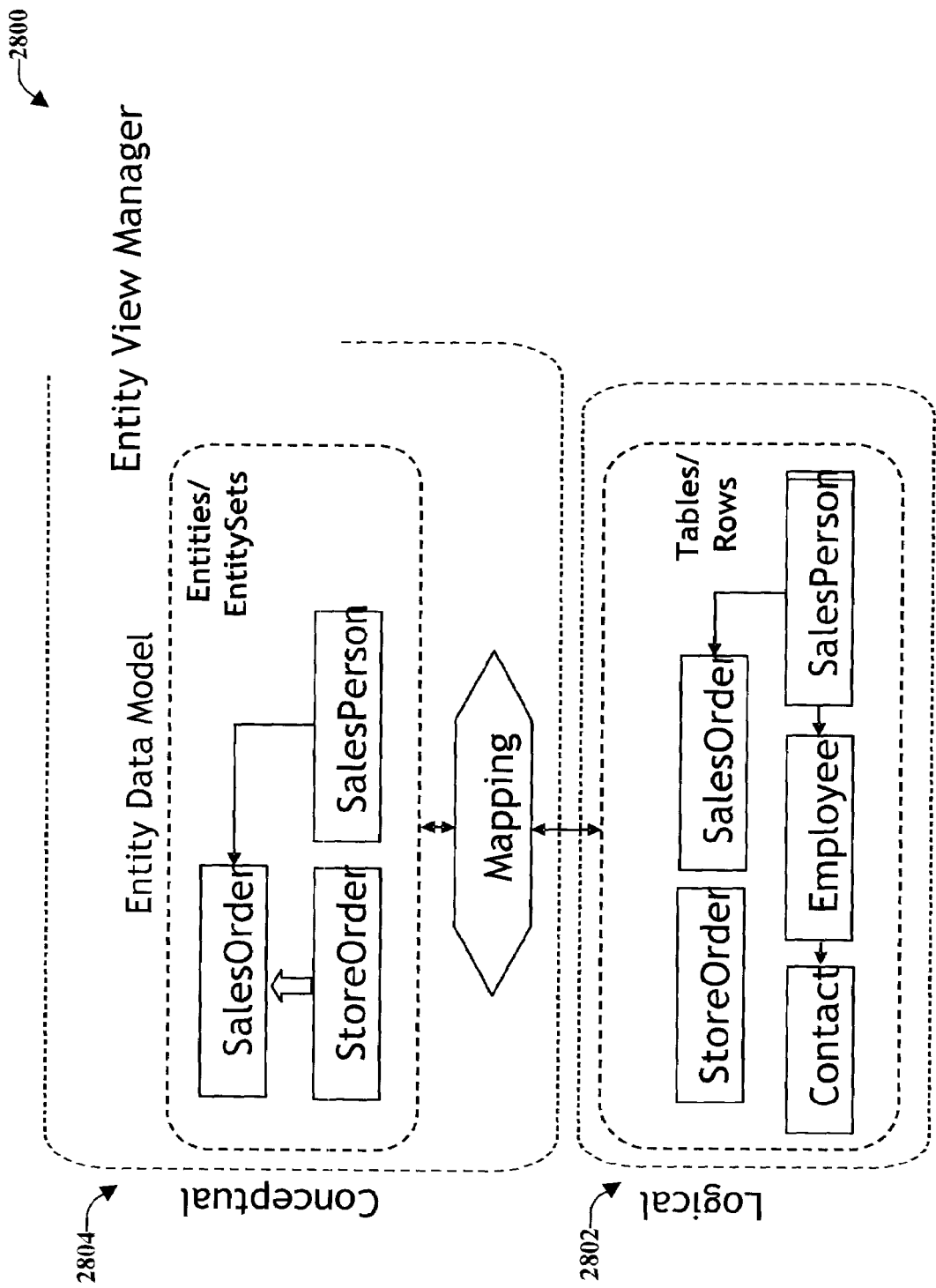
FIG. 28 illustrates various data services of data platform.

FIG. 28 illustrates various data services of data platform. Such services can be logical 2802 or conceptual 2804. Logical services 2082 can be for example, transact SQL and can take the following format:

SELECT SalesPersonID, FirstName, HireDate
FROM SalesPerson sp
INNER JOIN Employee e ON
   Sp.SalesPersonID=e.EmployeeID
INNER JOIN Contract c ON
   e.EmployeeID=c.ContactID
WHERE e.HireDate<@date";

and conceptual services 2804 can be an entity view manager and include an entity SQL with the following format.

SELECT VALUE so
FROM AWorks.AWorksDB.SalesOrders AS so
WHERE so.OrderDate<@date";

The conceptual services 2804 can include an entity data model that provides entities and relationships. Also provided is an entity SQL that can be based on extended relational algebra, for example. The entity SQL can produce and consume entities, providing better navigation across relations. An entity view manager can provide an entity runtime and can provide conceptual to logical mapping.

Figure 29:
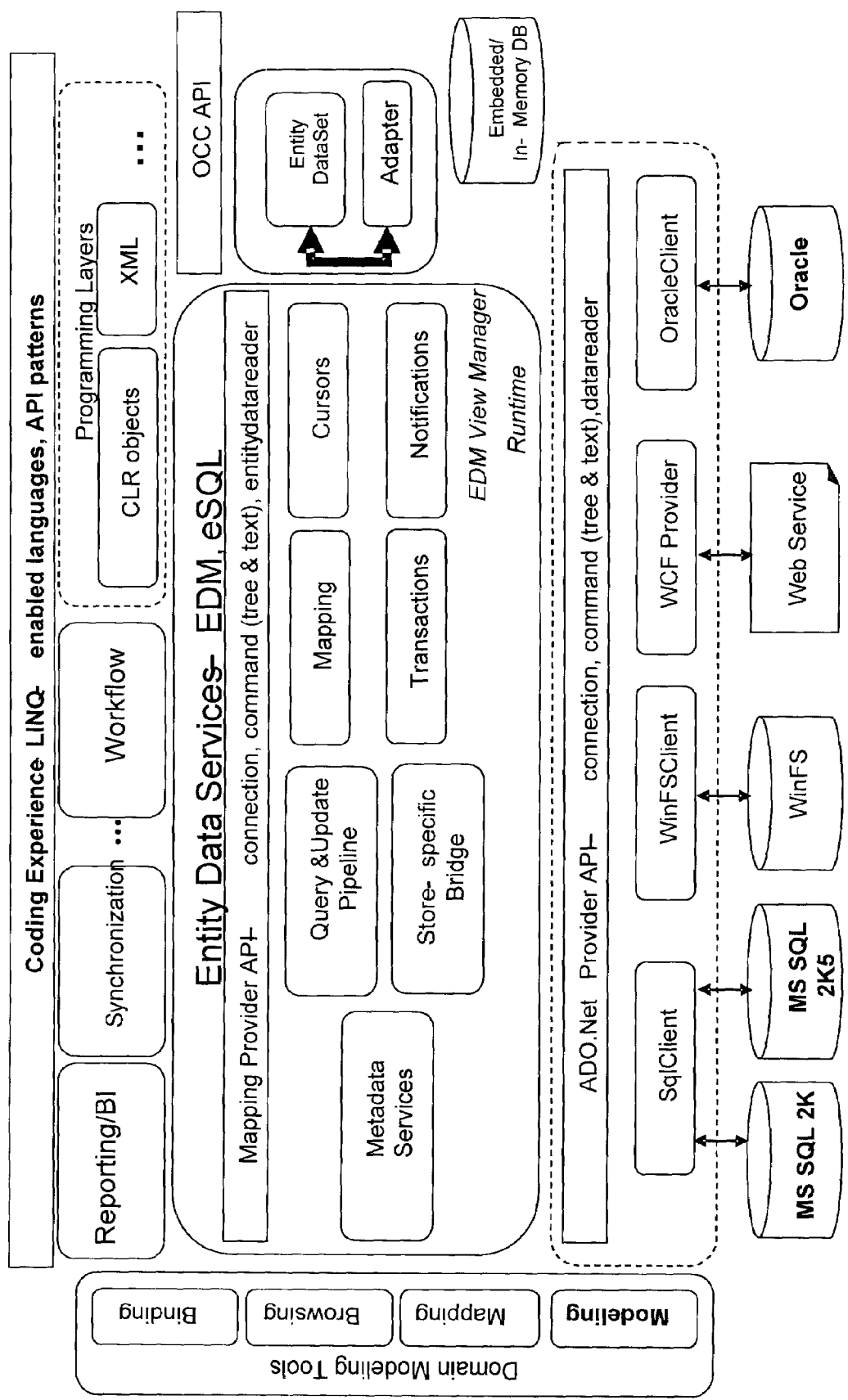
FIG. 29 illustrates a data platform architecture.

With reference now to FIG. 29, illustrated is a data platform architecture 2900. The platform can provide be database mirroring, and VLDB as well as Native XML support. Also provided can be multi-language programmability and extensibility, server reporting, enterprise ETL, and deep data mining.

Figure 30:
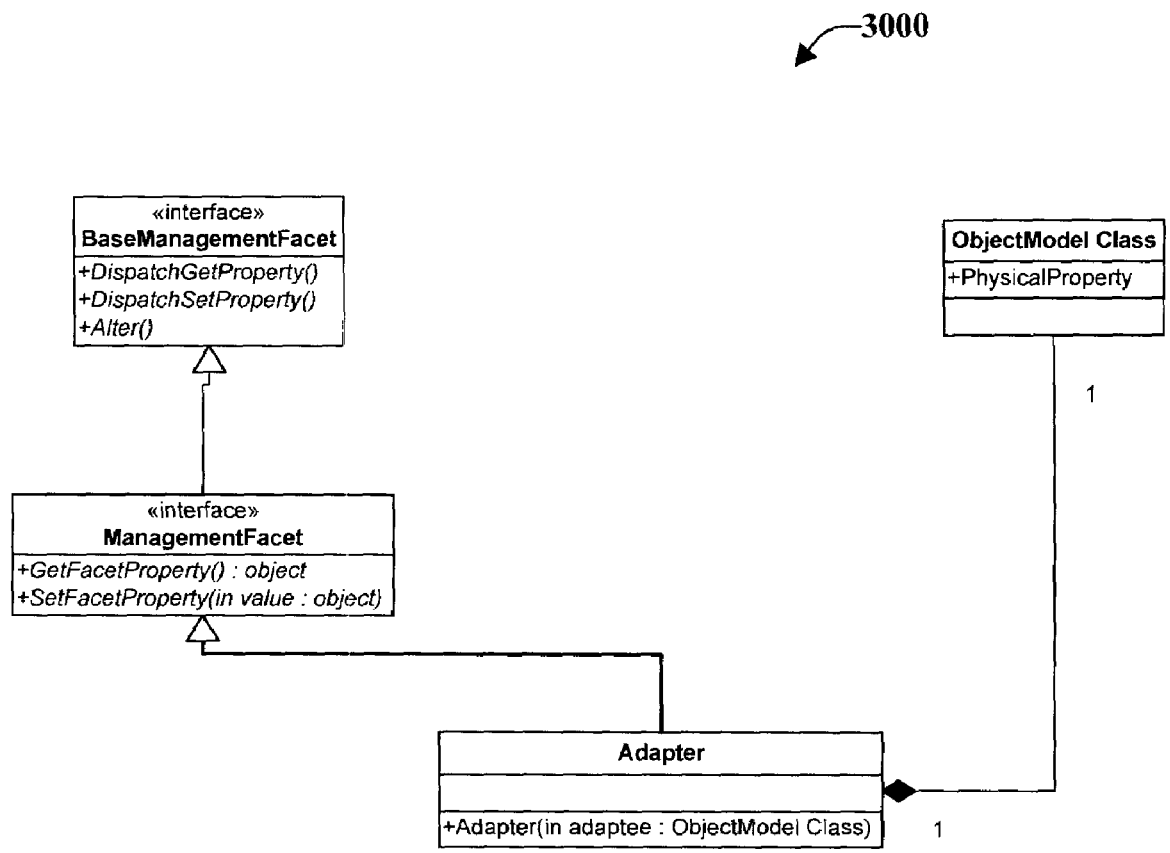
FIG. 30 illustrates an exemplary adapter diagram.

FIG. 30 illustrates an exemplary adapter diagram 3000. Facets 3002 can derive from a common interface, such as BaseFacet 3004, which can contain dispatch methods for accessing properties and commit logic. Each facet can define properties, which can be read only or read/write properties. An adapter class 3005 can inherit from the BaseFacet interface and can aggregate an underlying object model class. The adapter can utilize the physical properties of the object model class 3008 (and other logic) to expose the facet properties.

Figure 31:
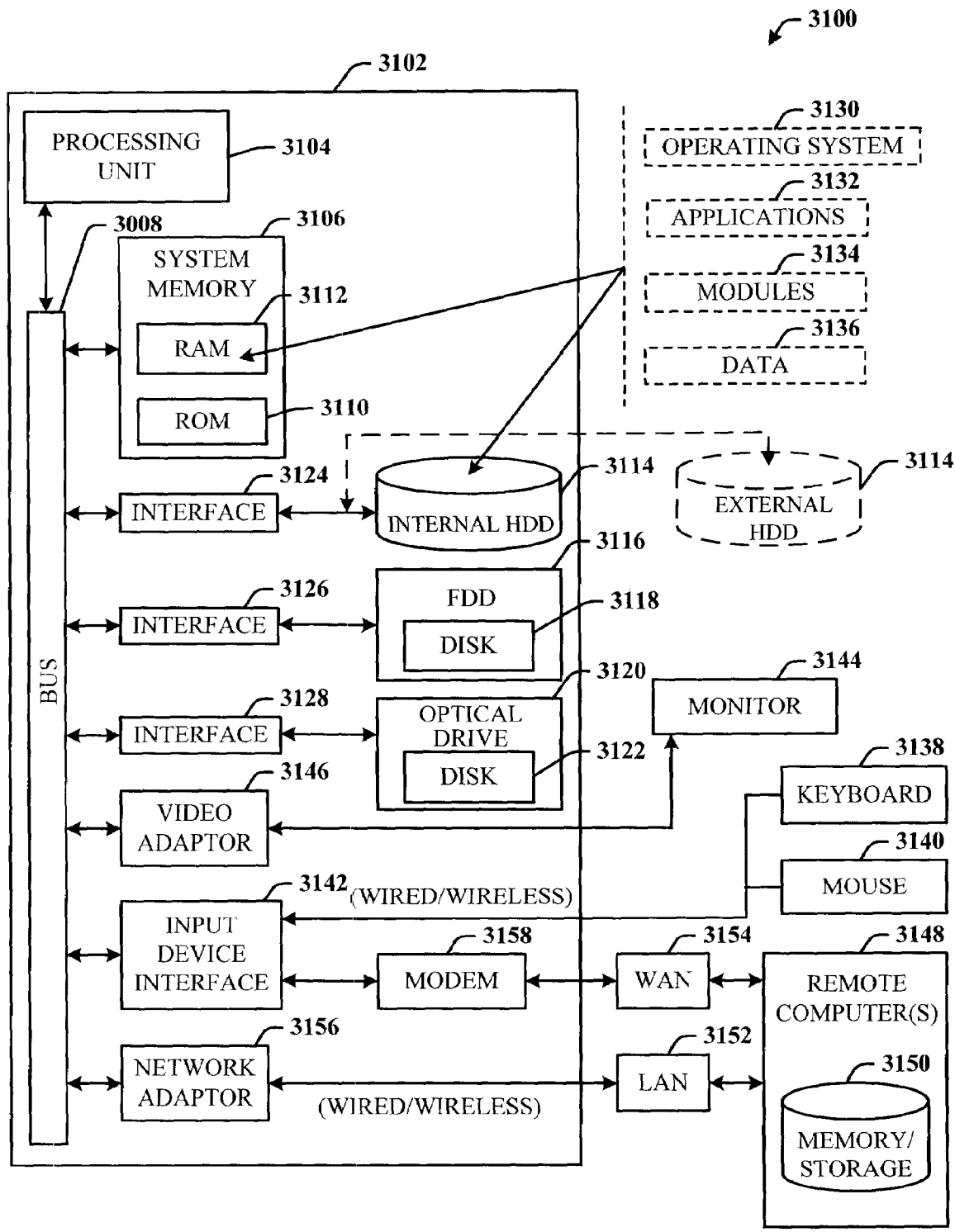
FIG. 31 illustrates a block diagram of a computer operable to execute the disclosed embodiments.

Referring now to FIG. 31, there is illustrated a block diagram of a computer operable to execute the disclosed architecture. In order to provide additional context for various aspects disclosed herein, FIG. 31 and the following discussion are intended to provide a brief, general description of a suitable computing environment 3100 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc. . . . , that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 31, the exemplary environment 3100 for implementing various aspects includes a computer 3102, the computer 3102 including a processing unit 3104, a system memory 3106 and a system bus 3108. The system bus 3108 couples system components including, but not limited to, the system memory 3106 to the processing unit 3104. The processing unit 3104 can be any of various commercially available processors. Dual microprocessors and other multi-processor architectures may also be employed as the processing unit 3104.

The system bus 3108 can be any of several types of bus structure that may further interconnect to a memory bus (with or without a memory controller), a peripheral bus, and a local bus using any of a variety of commercially available bus architectures. The system memory 3106 includes read-only memory (ROM) 3110 and random access memory (RAM) 3112. A basic input/output system (BIOS) is stored in a non-volatile memory 3110 such as ROM, EPROM, EEPROM, which BIOS contains the basic routines that help to transfer information between elements within the computer 3102, such as during start-up. The RAM 3112 can also include a high-speed RAM such as static RAM for caching data.

The computer 3102 further includes an internal hard disk drive (HDD) 3114 (e.g., EIDE, SATA), which internal hard disk drive 3114 may also be configured for external use in a suitable chassis (not shown), a magnetic floppy disk drive (FDD) 3116, (e.g., to read from or write to a removable diskette 3118) and an optical disk drive 3120, (e.g., reading a CD-ROM disk 3122 or, to read from or write to other high capacity optical media such as the DVD). The hard disk drive 3114, magnetic disk drive 3116 and optical disk drive 3120 can be connected to the system bus 3108 by a hard disk drive interface 3124, a magnetic disk drive interface 3126 and an optical drive interface 3128, respectively. The interface 3124 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 3102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 3112, including an operating system 3130, one or more application programs 3132, other program modules 3134 and program data 3136. All or portions of the operating system, applications, modules, and/or data can also be cached in the RAM 3112. It is appreciated that the various embodiments can be implemented with various commercially available operating systems or combinations of operating systems.

A user can enter commands and information into the computer 3102 through one or more wired/wireless input devices, e.g. a keyboard 3138 and a pointing device, such as a mouse 3140. Other input devices (not shown) may include a microphone, an IR remote control, a joystick, a game pad, a stylus pen, touch screen, or the like. These and other input devices are often connected to the processing unit 3104 through an input device interface 3142 that is coupled to the system bus 3108, but can be connected by other interfaces, such as a parallel port, an IEEE 1394 serial port, a game port, a USB port, an IR interface, etc.

A monitor 3144 or other type of display device is also connected to the system bus 3108 through an interface, such as a video adapter 3146. In addition to the monitor 3144, a computer typically includes other peripheral output devices (not shown), such as speakers, printers, etc.

The computer 3102 may operate in a networked environment using logical connections through wired and/or wireless communications to one or more remote computers, such as a remote computer(s) 3148. The remote computer(s) 3148 can be a workstation, a server computer, a router, a personal computer, portable computer, microprocessor-based entertainment appliance, a peer device or other common network node, and typically includes many or all of the elements described relative to the computer 3102, although, for purposes of brevity, only a memory/storage device 3150 is illustrated. The logical connections depicted include wired/wireless connectivity to a local area network (LAN) 3152 and/or larger networks, e.g. a wide area network (WAN) 3154. Such LAN and WAN networking environments are commonplace in offices and companies, and facilitate enterprise-wide computer networks, such as intranets, all of which may connect to a global communications network, e.g., the Internet.

When used in a LAN networking environment, the computer 3102 is connected to the local network 3152 through a wired and/or wireless communication network interface or adapter 3156. The adaptor 3156 may facilitate wired or wireless communication to the LAN 3152, which may also include a wireless access point disposed thereon for communicating with the wireless adaptor 3156.

When used in a WAN networking environment, the computer 3102 can include a modem 3158, or is connected to a communications server on the WAN 3154, or has other means for establishing communications over the WAN 3154, such as by way of the Internet. The modem 3158, which can be internal or external and a wired or wireless device, is connected to the system bus 3108 through the serial port interface 3142. In a networked environment, program modules depicted relative to the computer 3102, or portions thereof, can be stored in the remote memory/storage device 3150. It will be appreciated that the network connections shown are exemplary and other means of establishing a communications link between the computers can be used.

The computer 3102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 32:
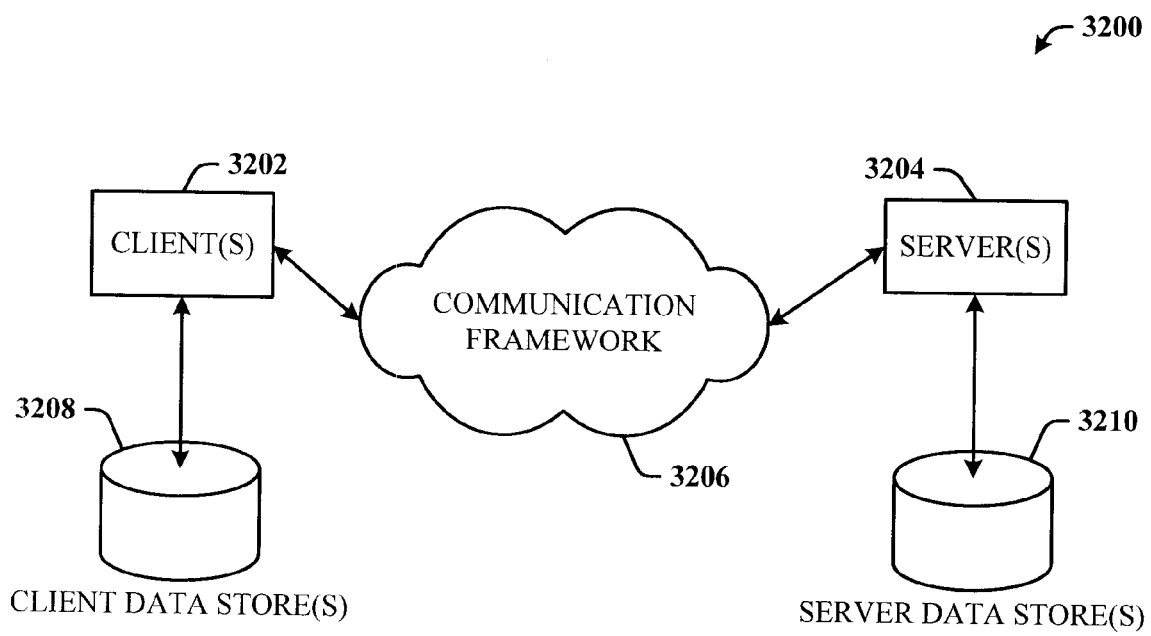
FIG. 32 illustrates a schematic block diagram of an exemplary computing environment operable to execute the disclosed embodiments.

Referring now to FIG. 32, there is illustrated a schematic block diagram of an exemplary computing environment 3200 in accordance with the various embodiments. The system 3200 includes one or more client(s) 3202. The client(s) 3202 can be hardware and/or software (e.g., threads, processes, computing devices). The client(s) 3202 can house cookie(s) and/or associated contextual information by employing the various embodiments, for example.

The system 3200 also includes one or more server(s) 3204. The server(s) 3204 can also be hardware and/or software (e.g., threads, processes, computing devices). The servers 3204 can house threads to perform transformations by employing the various embodiments, for example. One possible communication between a client 3202 and a server 3204 can be in the form of a data packet adapted to be transmitted between two or more computer processes. The data packet may include a cookie and/or associated contextual information, for example. The system 3200 includes a communication framework 3206 (e.g., a global communication network such as the Internet) that can be employed to facilitate communications between the client(s) 3202 and the server(s) 3204.

Communications can be facilitated through a wired (including optical fiber) and/or wireless technology. The client(s) 3202 are operatively connected to one or more client data store(s) 3208 that can be employed to store information local to the client(s) 3202 (e.g., cookie(s) and/or associated contextual information). Similarly, the server(s) 3204 are operatively connected to one or more server data store(s) 3210 that can be employed to store information local to the servers 3204.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

What is claimed is:

1. A system that facilitates productivity of database management, comprising:
   an interface component comprising hardware that accepts a high-level intent structured in declarative language, wherein the intent is expressed in terms of a user's intent and are not expressed in terms of actual configuration setting that should be changed to facilitate such intent, and represents a request that a target set be brought into compliance with a policy, wherein the high-level intent is expressed declaratively as a sentence to specify results and not specific actions or settings, such that the intent must be inferred and such that slight deviations in actions or settings can nonetheless be made to match the high-level intent, wherein the high-level intent is expressed as a sentence and includes subcomponents, each of the subcomponents comprising a single word or phrase included in words of the sentence;
   a declarative management component comprising hardware that interprets the high-level intent and determines low-level settings to configure individual objects using specialized and distinct semantics for each individual object to cause the system to brought into compliance with the policy by recognizing keyword subcomponents of the sentence and performing one or more functions on keyword subcomponents of the sentence, including the single words or phrases of the sentence, to determine user intent and one or more low-level settings, without further input from the user at least in part by identifying target elements that constitute an application, packaging the target elements as a target set, and deploying the application to additional systems; and
   a machine-learning component comprising hardware that automates at least one function of the declarative management component.

2. The system of claim 1, further comprising:
   a parse component comprising hardware that breaks the intent into subcomponents; and a syntax engine that analyzes each subcomponent to derive a specific intent.

3. The system of claim 1, further comprising a security component comprising hardware that deploys policies in a specific predefined configuration.

4. The system of claim 1, further comprising a historical component comprising hardware that maintains historical information relating to at least one of a policy, a policy version, a targets, and a facet.

5. The system of claim 1, further comprising an aggregation component comprising hardware that provides at least one of a management on scale and an automation on scale.

6. The system of claim 1, further comprising a configuration component comprising hardware that incrementally adds at least one of a facet and a target by extending a programming model.

7. The system of claim 1, further comprising an optimization component comprising hardware that extends applications across at least one of multiple servers and multiple products.

8. The system of claim 1, further comprising a binding component comprising hardware that comprises a policy and a target set, the policy and the target set may be referenced by more than one binding.

9. The system of claim 1, the declarative management component comprising hardware provides an application view of a server that comprises multiple applications.

10. A method for providing an interface between a high-level intent and a low-level setting, comprising:
    receiving a declarative intent from a user, wherein the intent requests an evaluation of a policy with a target set, wherein the intent is expressed in terms of a user's intent and are not expressed in terms of actual configuration setting that should be changed to facilitate such intent, wherein the high-level intent is expressed declaratively to specify results and not specific actions or settings, such that the intent must be inferred and such that slight deviations in actions or settings can nonetheless be made to match the high-level intent, wherein the high-level intent is expressed as a sentence and includes subcomponents, each of the subcomponents comprising a single word or phrase included in words of the sentence;
    automatically determining one or more level setting to configure to achieve the intent to configure individual objects using specialized and distinct semantics for each individual object, to cause the system to brought into compliance with the policy by recognizing keyword subcomponents of the sentence and performing one or more functions on keyword subcomponents of the sentence, including the single words or phrases of the sentence, to determine user intent and one or more low-level settings, at least in part by indicating which target elements constitute an application, grouping the target elements as a single target consisting of various individual target elements, and deploying the application to additional systems; and
    configuring the one or more setting to cause the system to brought into compliance with the policy, without further input from the user.

11. The method of claim 10, further comprising providing monitoring for conformance to the received declarative intent.

12. The method of claim 10, further comprising performing a policy binding to map a policy to a target set.

13. The method of claim 10, further comprising checking for constraints or violations.

14. The method of claim 10, further comprising providing a report function.

15. The method of claim 10, configuring the one or more setting is across multiple databases.

16. A system that facilitates productivity of database management, comprising:
    an interface component comprising hardware that accepts a high-level intent structured in declarative language, wherein the intent is expressed in terms of a user's intent and are not expressed in terms of actual configuration setting that should be changed to facilitate such intent, and represents a check that a policy complies with a target set or a request that a target set be brought into compliance with a policy, wherein the high-level intent is expressed declaratively to specify results and not specific actions or settings, such that the intent must be inferred and such that slight deviations in actions or settings can nonetheless be made to match the high-level intent, wherein the high-level intent is expressed as a sentence and includes subcomponents, each of the subcomponents comprising a single word or phrase included in words of the sentence; and
    a declarative management component comprising hardware that interprets the high-level intent and automatically applies such intent to low-level settings to configure individual objects using specialized and distinct semantics for each individual object to cause the system to brought into compliance with the policy by recognizing keyword subcomponents of the sentence and performing one or more functions on subcomponents of the sentence, including the single words or phrases of the sentence, to determine user intent and one or more low-level settings, without further input from the user at least in part by identifying target elements that constitute an application, packaging the target elements as a target set, and deploying the application to additional systems.

* * * * *